(12) United States Patent
Kuromizu

(10) Patent No.: US 8,651,683 B2
(45) Date of Patent: Feb. 18, 2014

(54) LIGHTING DEVICE, DISPLAY DEVICE AND TELEVISION RECEIVER

(75) Inventor: Yasumori Kuromizu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 148 days.

(21) Appl. No.: 13/395,462

(22) PCT Filed: Aug. 19, 2010

(86) PCT No.: PCT/JP2010/063980
§ 371 (c)(1),
(2), (4) Date: Mar. 12, 2012

(87) PCT Pub. No.: WO2011/033896
PCT Pub. Date: Mar. 24, 2011

(65) Prior Publication Data
US 2012/0169944 A1 Jul. 5, 2012

(30) Foreign Application Priority Data
Sep. 16, 2009 (JP) ................................ 2009-214932

(51) Int. Cl.
*G09F 13/04* (2006.01)

(52) U.S. Cl.
USPC ......... 362/97.1; 362/97.3; 362/532; 362/534; 362/623

(58) Field of Classification Search
USPC ........... 362/97.1, 97.3, 532, 533, 534; 349/65
See application file for complete search history.

(56) References Cited

U.S. PATENT DOCUMENTS

| 6,885,411 | B2 * | 4/2005 | Ogawa et al. .................... 349/58 |
| 7,604,390 | B2 * | 10/2009 | Zhang et al. .................. 362/634 |
| 2002/0044437 | A1 * | 4/2002 | Lee .................................. 362/31 |
| 2006/0109643 | A1 | 5/2006 | Chang |
| 2007/0047225 | A1 * | 3/2007 | Sudo ............................. 362/225 |
| 2010/0284172 | A1 | 11/2010 | Yokota |

FOREIGN PATENT DOCUMENTS

| JP | 2000-276929 A | 10/2000 |
| JP | 2006-146126 A | 6/2006 |
| JP | 2007-073374 A | 3/2007 |
| WO | 2009/110138 A1 | 9/2009 |

OTHER PUBLICATIONS

Official Communication issued in International Patent Application No. PCT/JP2010/063980, mailed on Nov. 30, 2010.
Shimizu, "Lighting Device, Display Device, and Television Receiver", U.S. Appl. No. 13/395,459, filed Mar. 12, 2012.

(Continued)

*Primary Examiner* — Ali Alavi
(74) *Attorney, Agent, or Firm* — Keating & Bennett, LLP

(57) ABSTRACT

A lighting device includes a light source, a chassis, a reflection sheet, a spacer, and a press member. The chassis includes a bottom plate disposed on a side opposite to a light output side with respect to the light source and houses the light source. The reflection sheet includes a bottom portion disposed along the bottom plate and a rising portion rising from the bottom portion toward the light output side and reflects light. The spacer is arranged between the bottom plate and the rising portion. The press member has a press surface pressing the rising portion from the light output side. The press member and the spacer have mounting structures with which the press member is mounted to the spacer by moving the press member in a direction along the rising portion and to hold the press member to the spacer.

29 Claims, 29 Drawing Sheets

(56) References Cited

OTHER PUBLICATIONS

Kuromizu et al., "Lighting Device, Display Device and Television Receiver", U.S. Appl. No. 13/395,457, filed Mar. 12, 2012.
Kuromizu, "Lighting Device, Display Device, and Television Receiver", U.S. Appl. No. 13/395,463, filed Mar. 12, 2012.
Kuromizu, "Lighting Device, Display Device and Television Receiver", U.S. Appl. No. 13/395,465, filed Mar. 12, 2012.
Kuromizu, "Lighting Device, Display Device and Television Receiver", U.S. Appl. No. 13/395,469, filed Mar. 12, 2012.

* cited by examiner

FIG.1
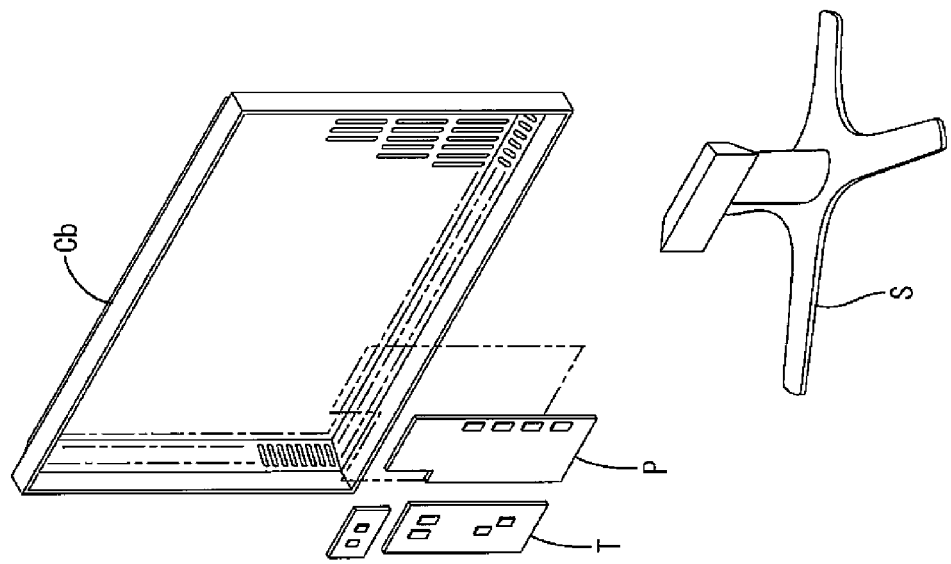
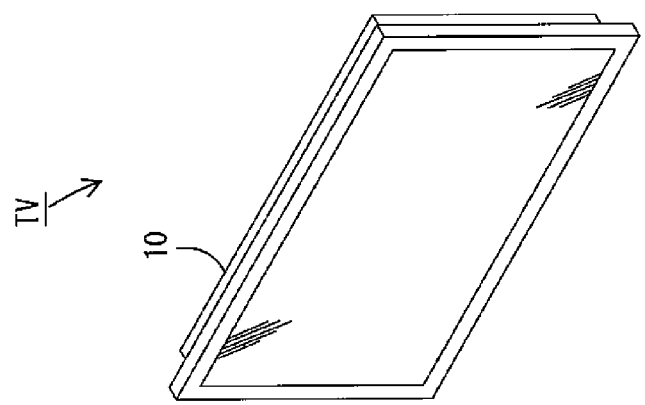
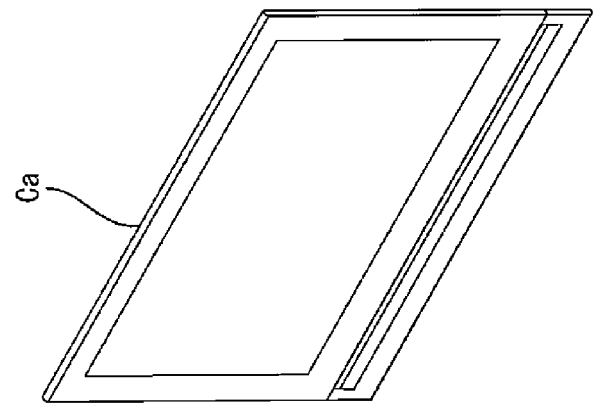

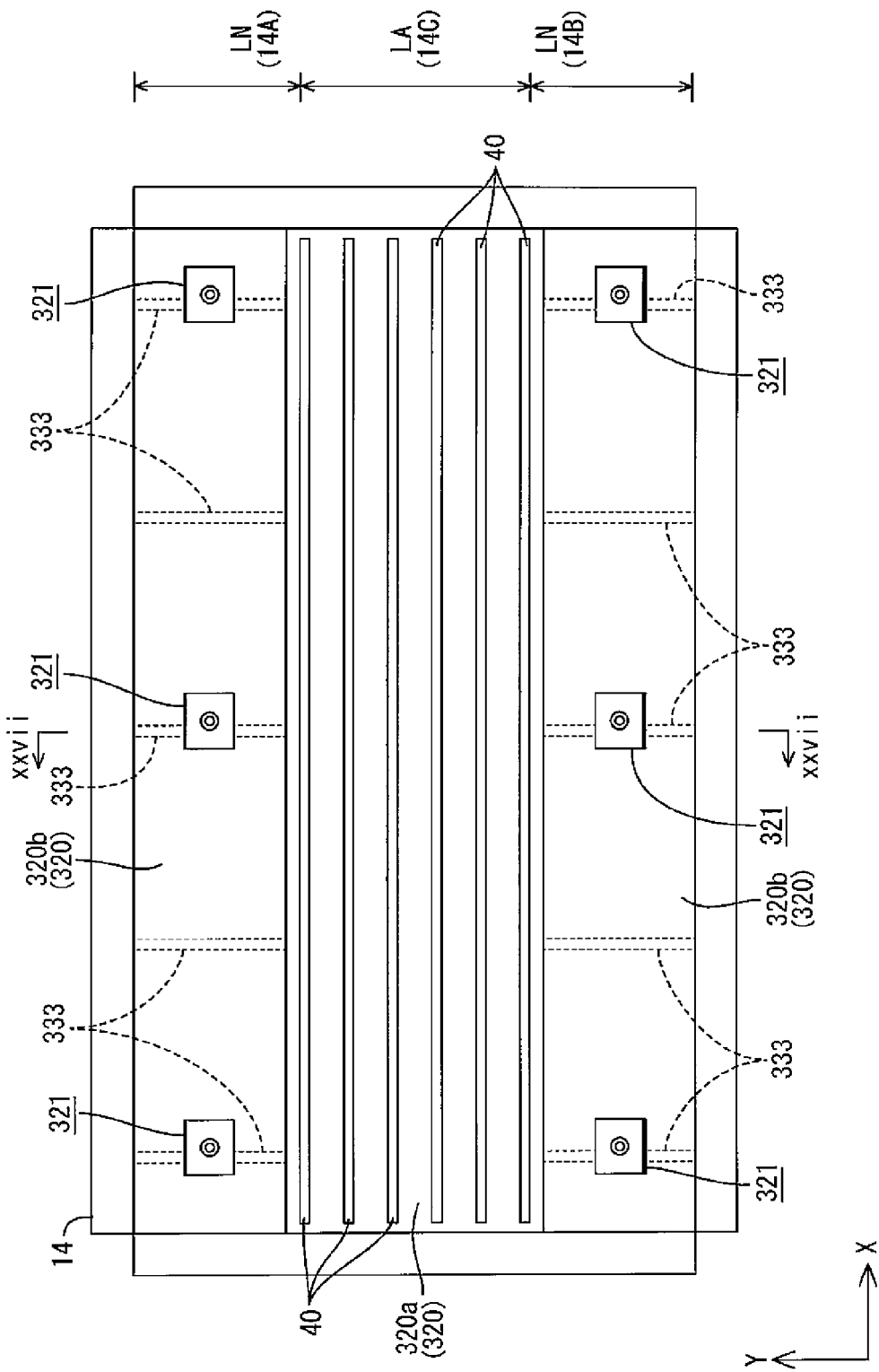

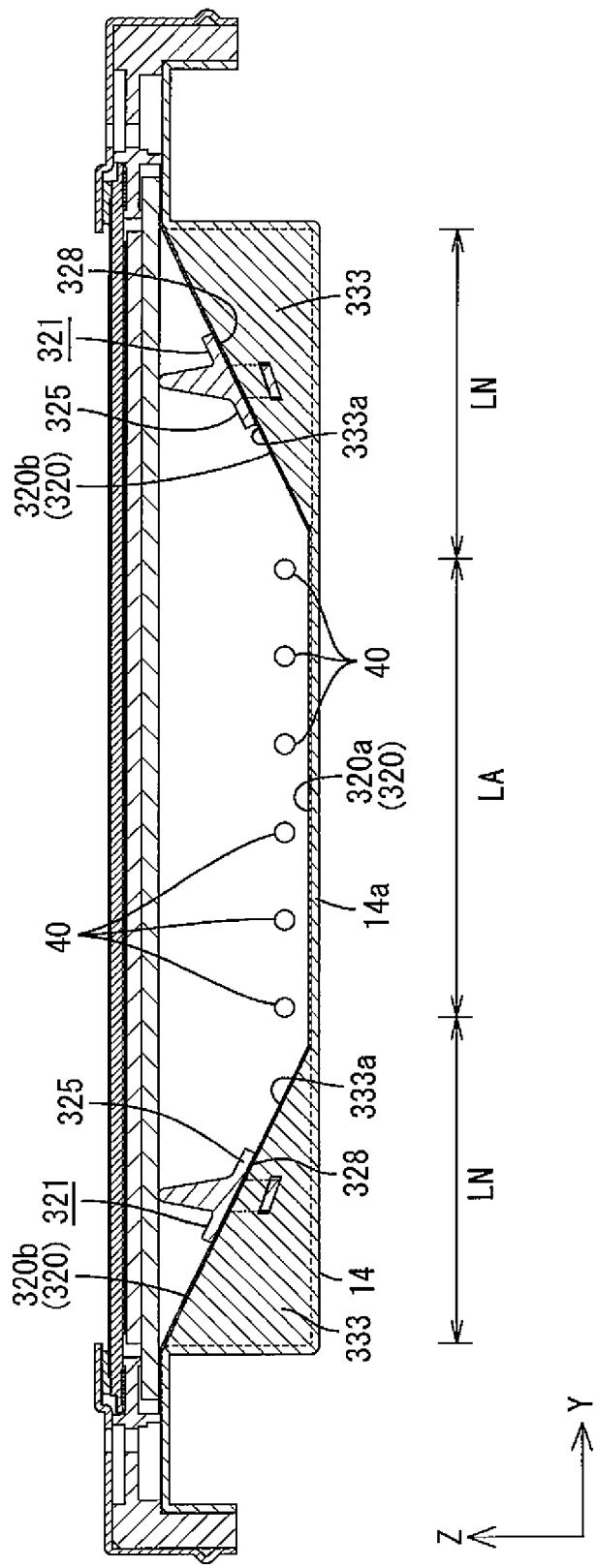

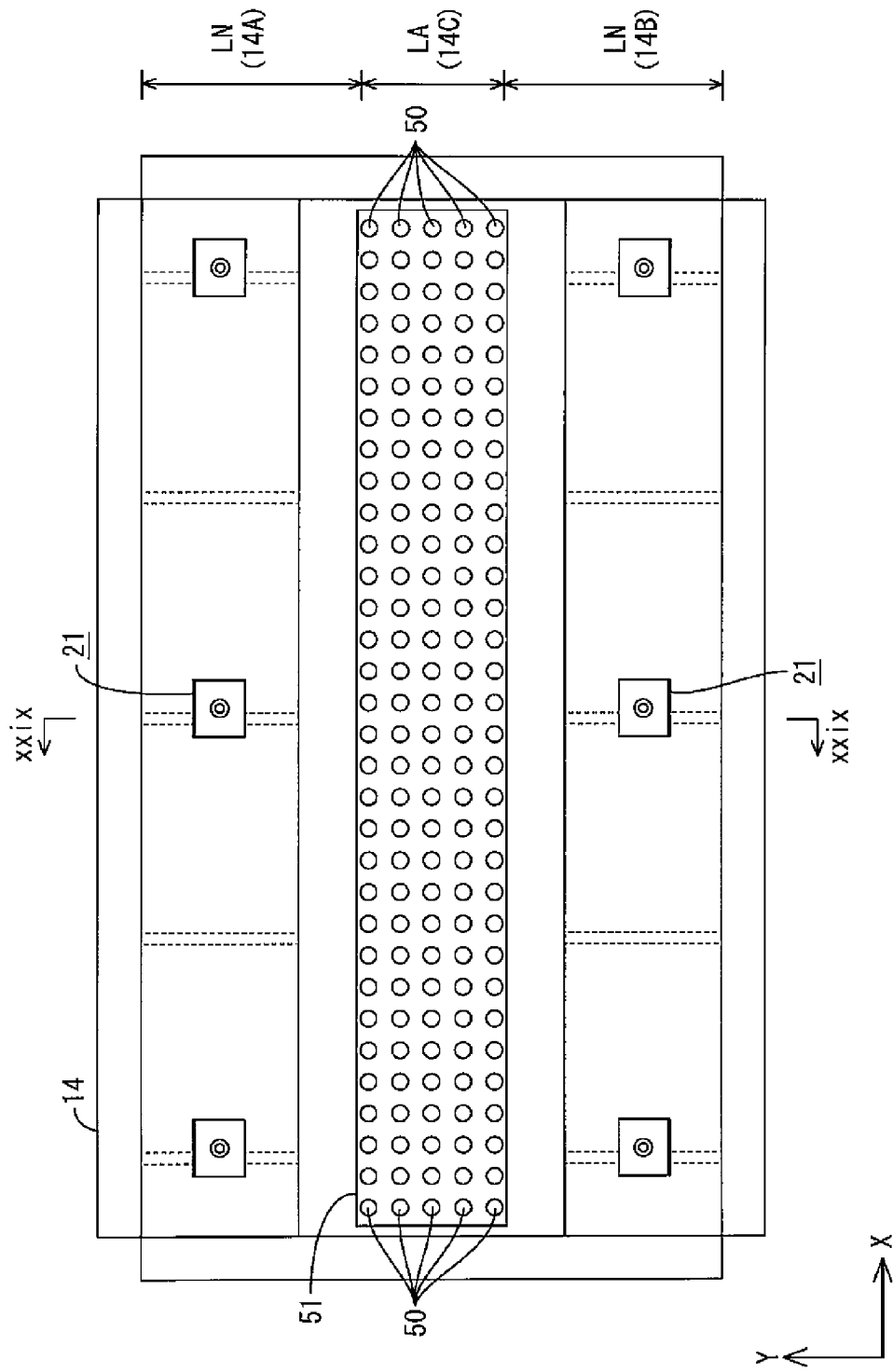

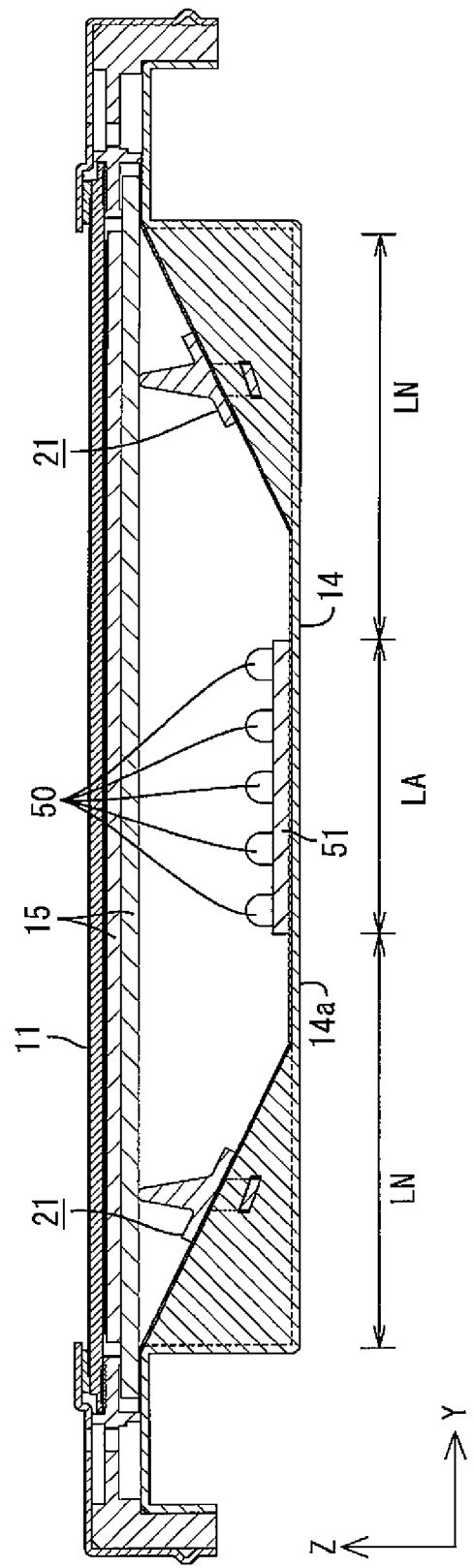

LIGHTING DEVICE, DISPLAY DEVICE AND TELEVISION RECEIVER

TECHNICAL FIELD

The invention relates to a lighting device, a display device and a television receiver.

BACKGROUND ART

For example, a liquid crystal panel for use in a liquid crystal display device such as a liquid crystal television set, does not emit light and thus needs a backlight unit as a separate lighting device. The backlight unit is mounted on the back side of the liquid crystal panel (opposite to a display surface), and includes a chassis with an open surface on the liquid crystal panel side; a light source (cold cathode tube or the like) housed in the chassis; an optical member (diffuser sheet or the like) disposed at the opening of the chassis and efficiently discharging light from the light source toward the liquid crystal panel; and a reflection sheet laid in the chassis and reflecting light from the light source toward the optical member and the liquid crystal panel. In addition, as an example of this kind of a backlight unit, there is a well-known backlight unit disclosed in Patent Document 1 shown below.
Patent Document 1: Japanese Unexamined Patent Publication No. 2006-146126

Problem to be Solved by the Invention

The reflection sheet constituting the foregoing backlight unit includes a bottom portion disposed along an inner surface of a bottom plate of the chassis and rising portions rising from the bottom portion toward the optical member, and is configured to direct reflected light toward a center of a screen by the rising portions.

However, the rising portions of the reflection sheet are configured to rise from the bottom portion, and thus tend to be unstable in shape because the rising portions are prone to have changes in angle of rising from the bottom portion and deform due to warpage or flexion. When the rising portions are unstable in shape, the direction of light reflected also becomes unstable, which may bring about unevenness in light emitted from the backlight unit.

DISCLOSURE OF THE INVENTION

The invention is completed under the foregoing circumstances. An object of the invention is to suppress uneven brightness.

Means for Solving the Problem

A lighting device of the invention includes a light source, a chassis, a reflection sheet, a spacer, a press member. The chassis includes a bottom plate disposed on a side opposite to a light output side with respect to the light source and houses the light source. The reflection sheet includes a bottom portion disposed along the bottom plate and a rising portion rising from the bottom portion toward the light output side. The reflection sheet reflects light. The spacer is arranged between the bottom plate and the rising portion. The press member has a press surface pressing the rising portion from the light output side. The press member and the spacer have mounting structures with which the press member is mounted to the spacer portion by moving the press member in a direction along the rising portion and to held the press member to the spacer.

The rising portion of the reflection sheet rises from the bottom portion toward the light output side. A shape of the reflection sheet tends to be unstable because an angle between the rising portion and the bottom portion may vary or deformation such as warpage and flexure may occur. In this regard, according to the invention, the rising portion is pressed by the press surface of the press member from the light output side and thus displacement of the rising portion toward the light output side is restricted. Accordingly, variations in the angle between the rising portion and the bottom portion are less likely to occur and deformation of the rising portion due to warpage or flexure is less likely to occur. Since the shape of the rising portion is maintained, the direction of light reflected off the rising portion can be stabilized. As a result, unevenness brightness is less likely to occur in light emitted from the lighting device.

Further, when the press member according to the invention is moved in a direction along the rising portion with respect to the spacer portion arranged between the rising portion of the reflection sheet and the bottom plate of the chassis, the press member is mounted to and held to the spacer by the mounting structure. Since the direction of movement of the press member during the mounting is set along the rising portion, the press surface is unlikely to be displaced to the light output side or the opposite side with respect to the rising portion as the press member is moved. Namely, a position at which the press surface presses the rising portion is less likely to be shifted and thus the press surface more properly holds down the rising portion. Therefore, the shape of the rising portion is more properly maintained, and the unevenness that may occur in the emitted light is effectively reduced.

BRIEF DESCRIPTION OF THE DRAWINGS

FIG. 1 is an exploded perspective view showing a schematic configuration of a television receiver according to a first embodiment of the invention;

FIG. 26 is a plane view showing layout of cold cathode tubes and press members in a chassis of a fourth embodiment of the invention;

FIG. 27 is a cross section view of FIG. 26 taken along line xxvii-xxvii;

FIG. 28 is a plane view showing layout of LEDs and press members in a chassis of a fifth embodiment of the invention; and FIG. 29 is a cross section view of FIG. 28 taken along line xxix-xxix;

BEST MODE FOR CARRYING OUT THE INVENTION

First Embodiment

A first embodiment of the invention will be described with reference to FIGS. 1 to 14. First, a configuration of a television receiver TV including a liquid crystal display device 10 will be described.

Figure 2:
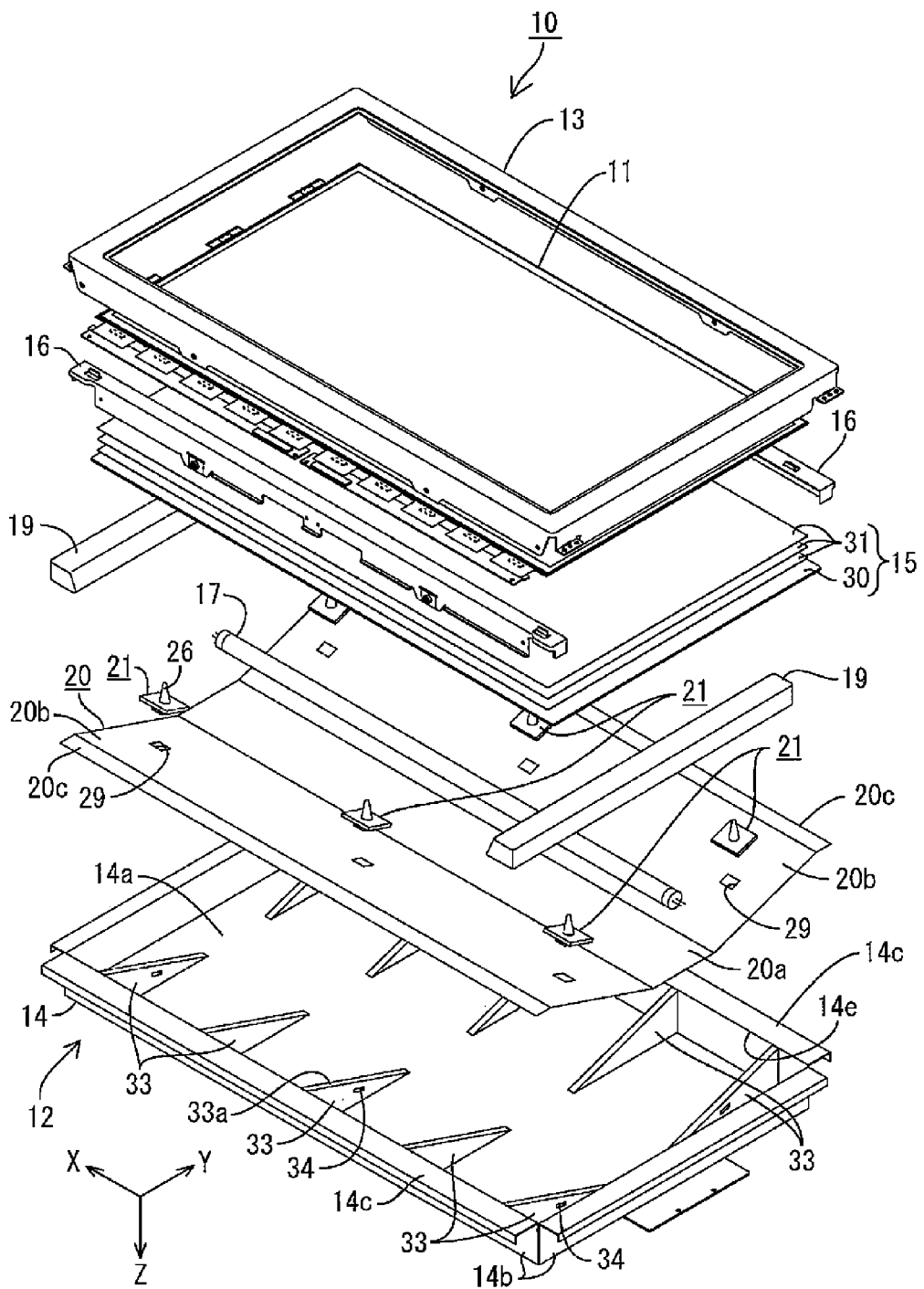
FIG. 2 is an exploded perspective view showing a schematic configuration of a liquid crystal display device included in the television receiver.
Figure 3:
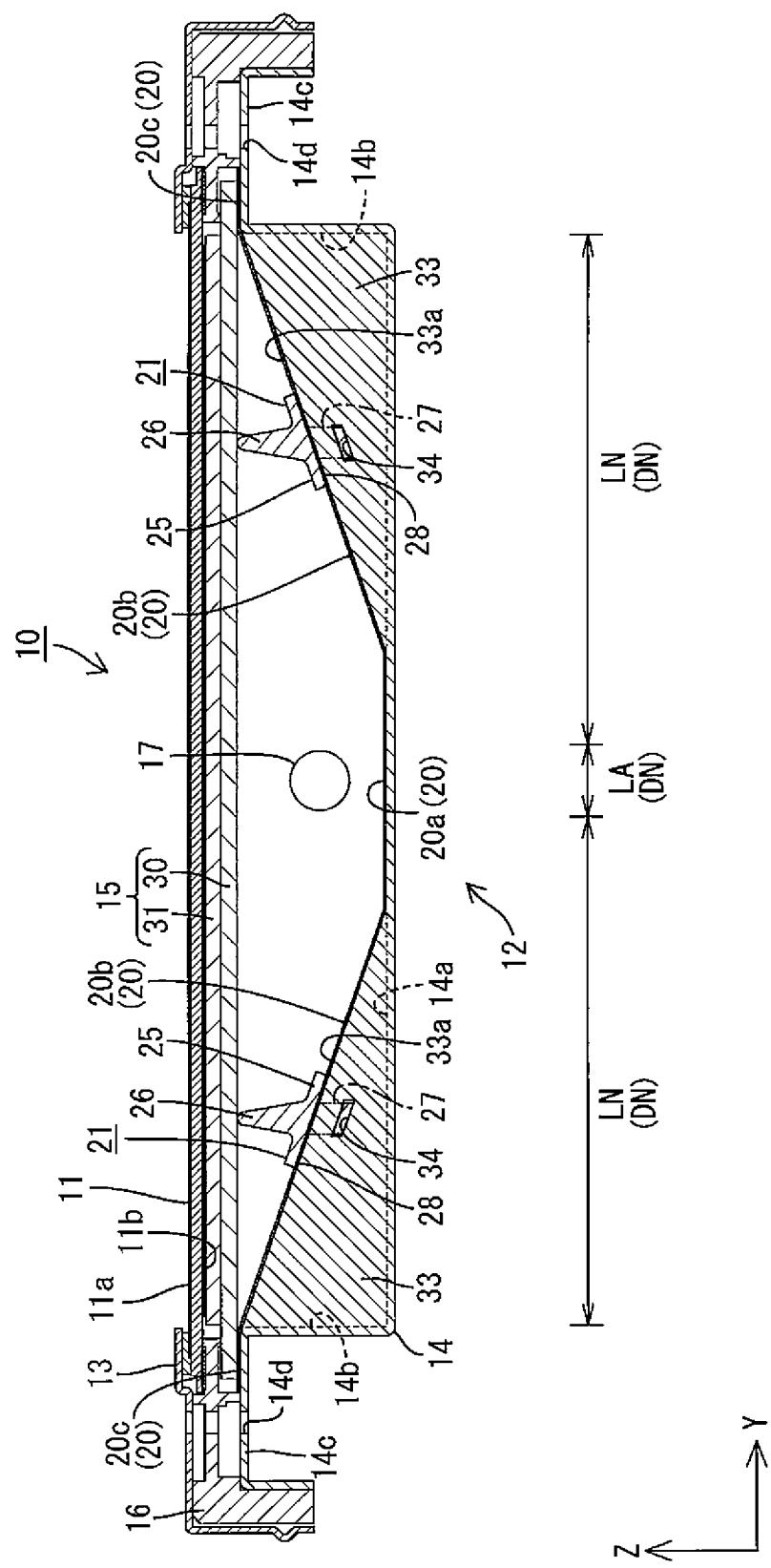
FIG. 3 is a cross section view of the liquid crystal display device along a shorter side.
Figure 4:
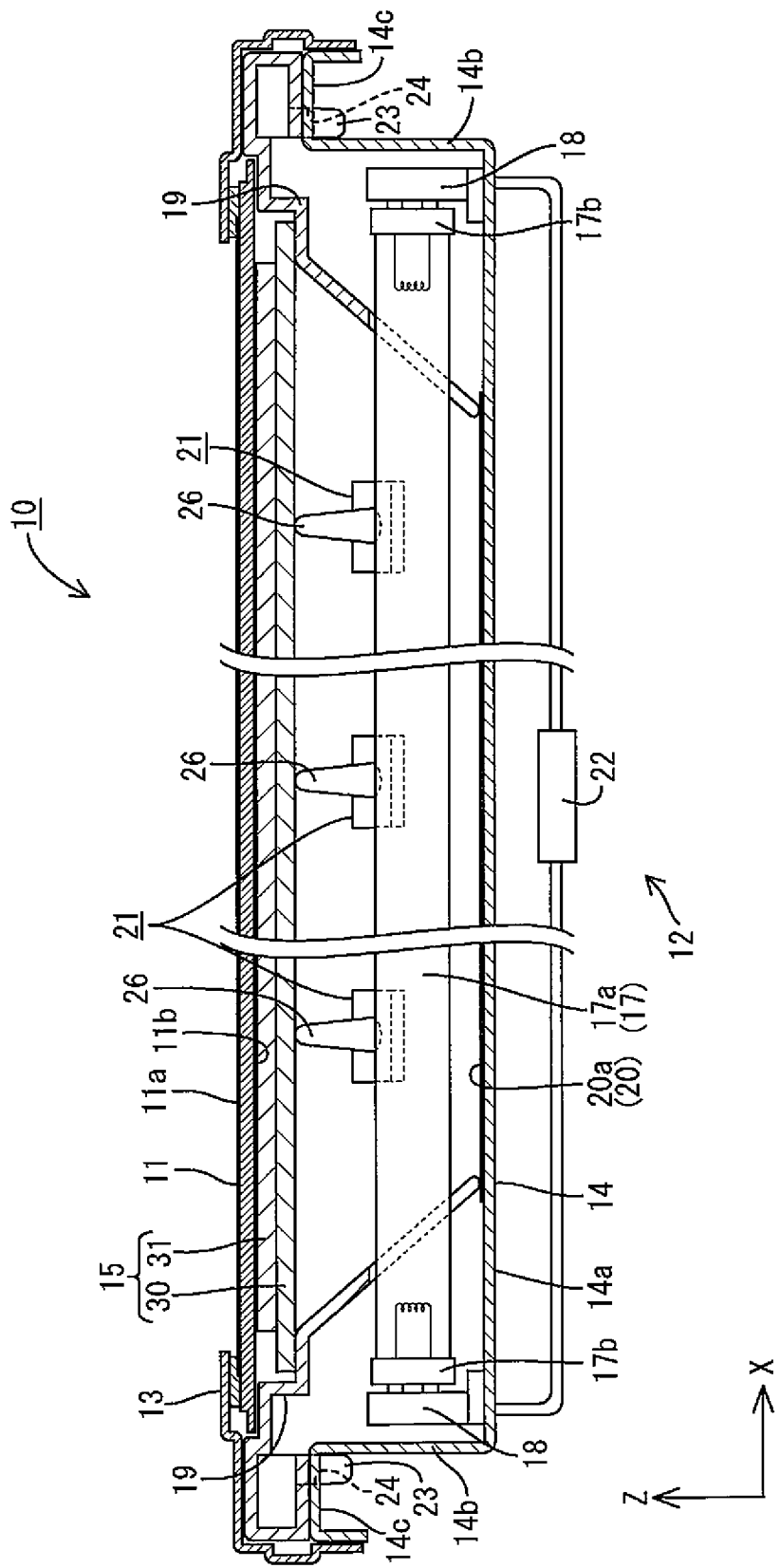
FIG. 4 is a cross section view of the liquid crystal display device along a longer side.
Figure 5:
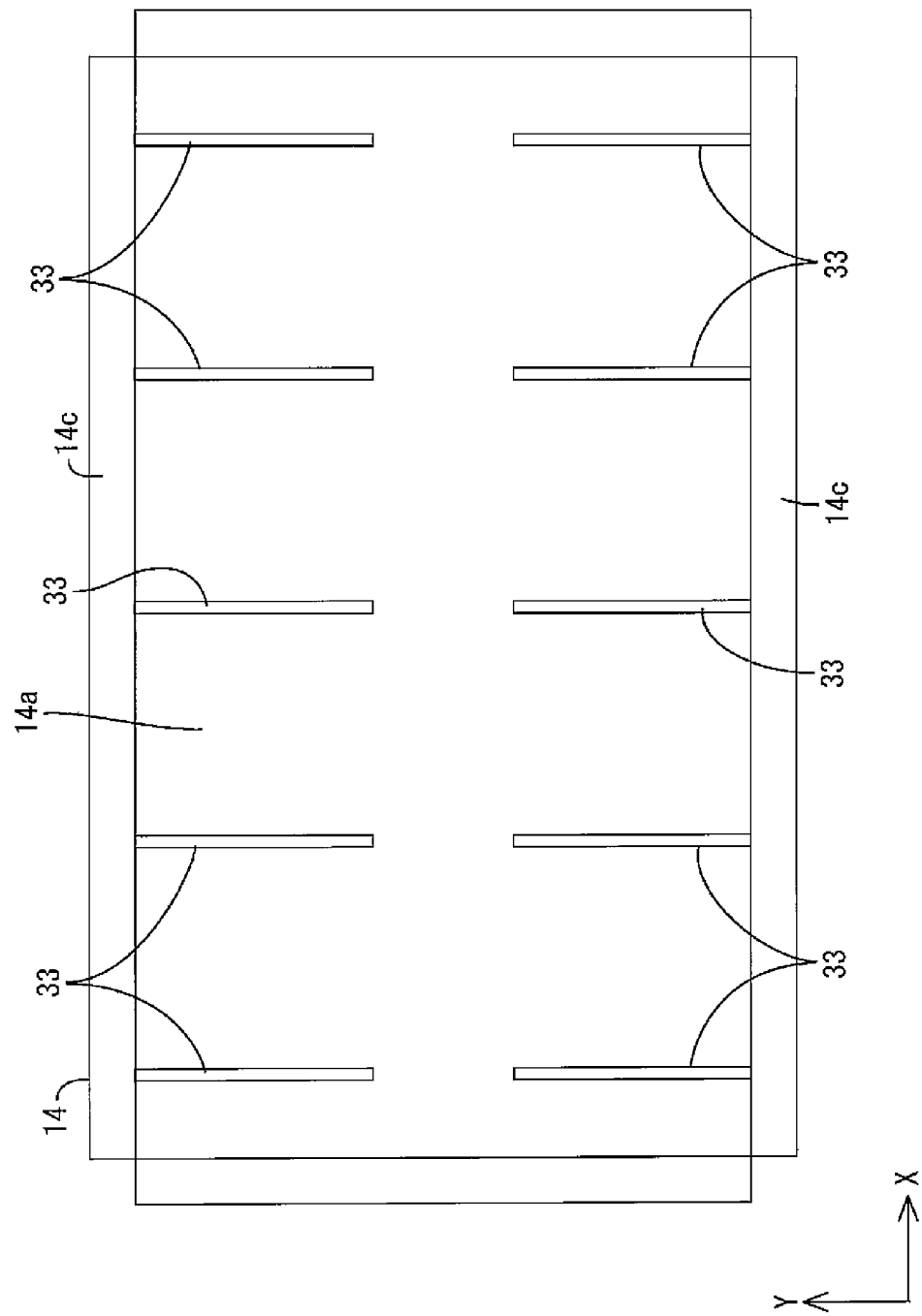
FIG. 5 is a plane view of a chassis included in the liquid crystal display device.
Figure 6:
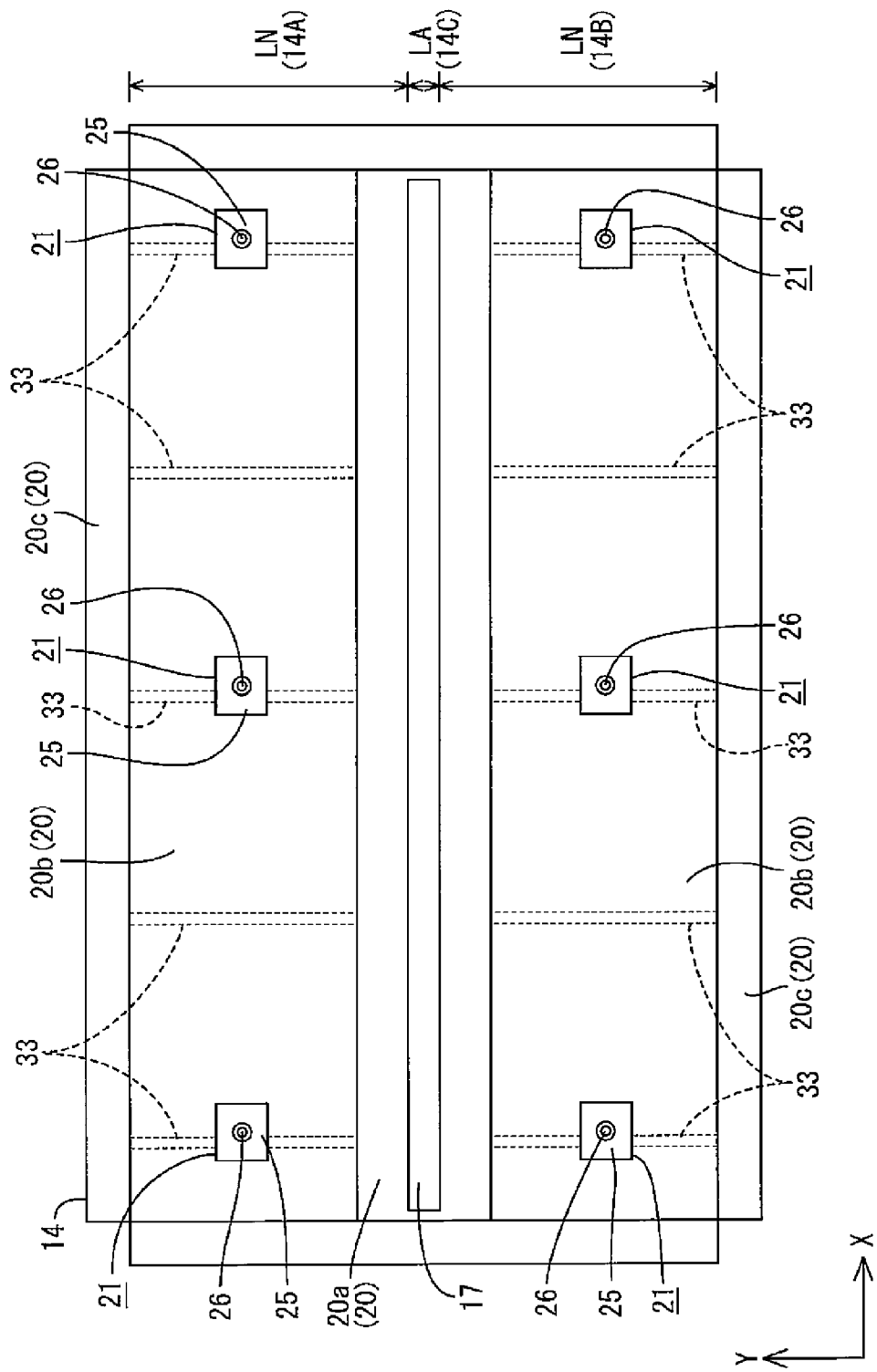
FIG. 6 is a plane view showing layout of a hot cathode tube and press members in the chassis included in the liquid crystal display panel.
Figure 7:
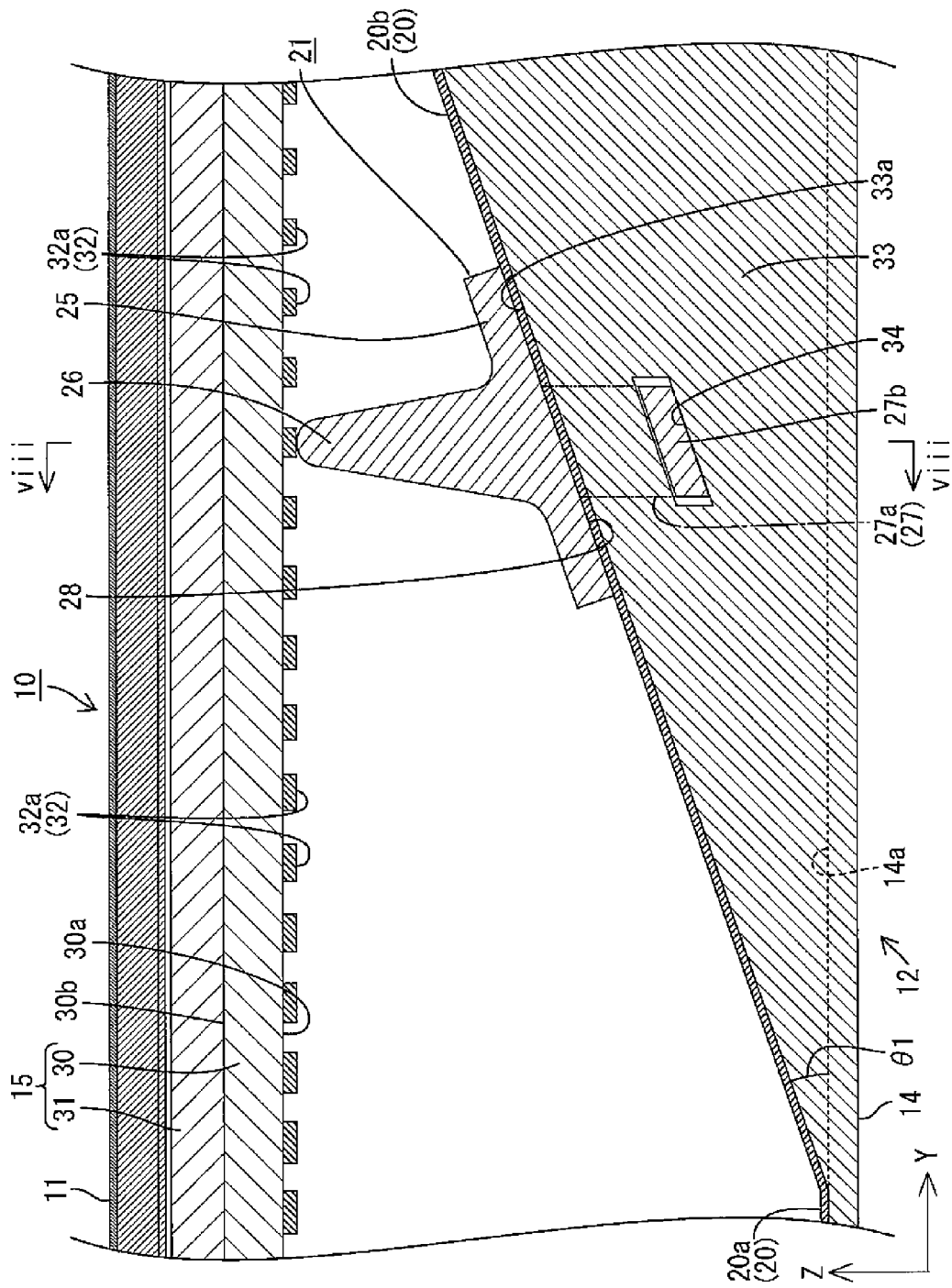
FIG. 7 is a cross section view of FIG. 3 in which major components are enlarged.
Figure 8:
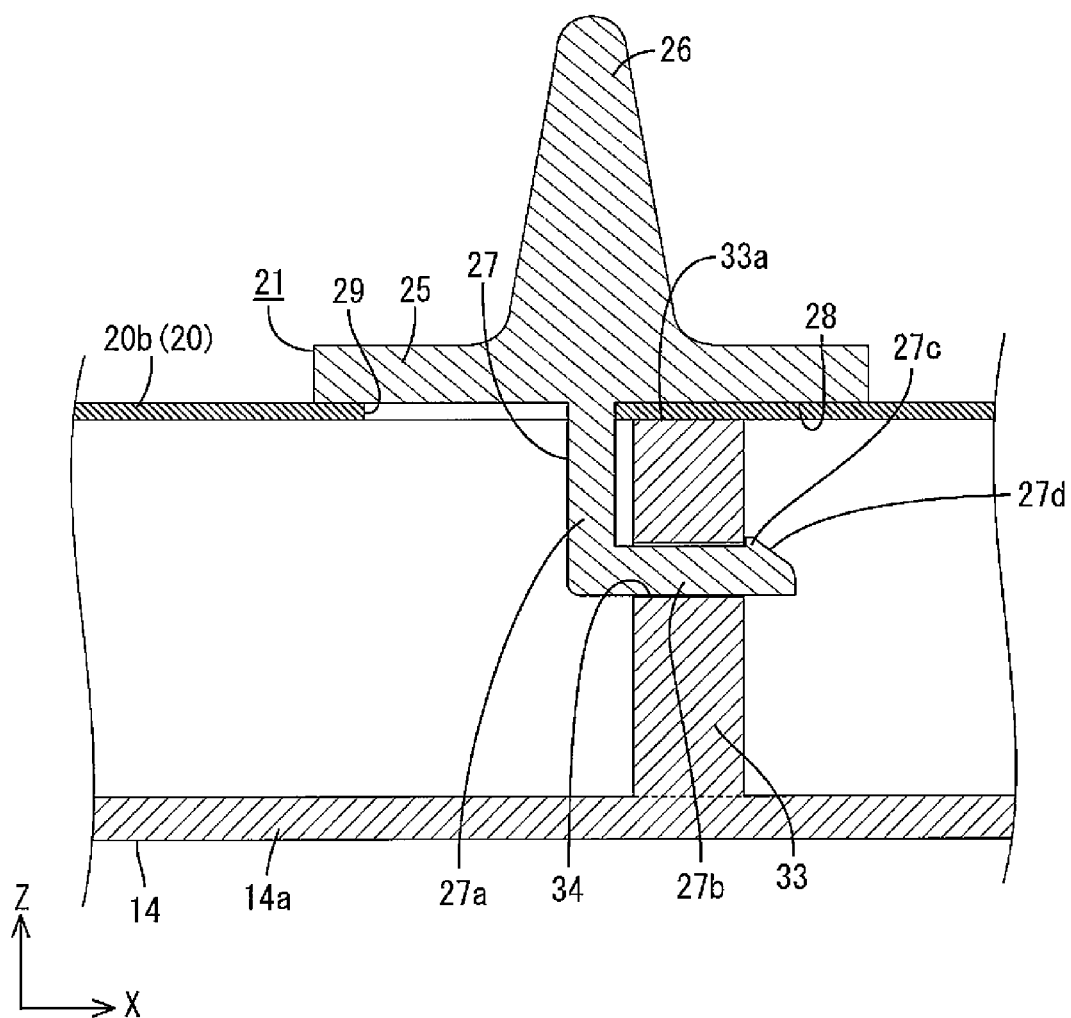
FIG. 8 is a cross section view of FIG. 7 taken along line viii-viii.
Figure 9:
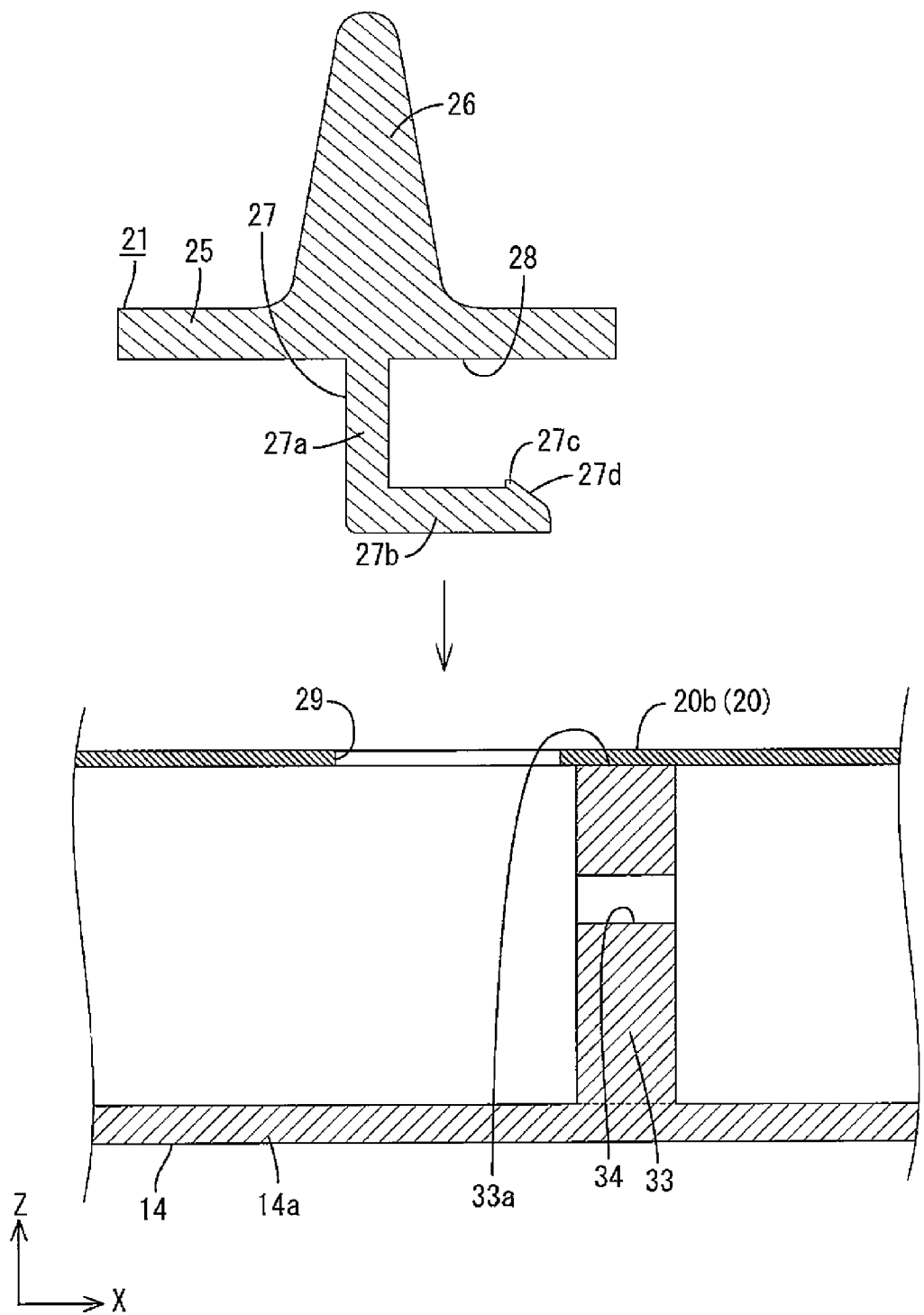
FIG. 9 is a cross section view of FIG. 7 taken along line viii-viii in which the press members are not yet attached.
Figure 10:
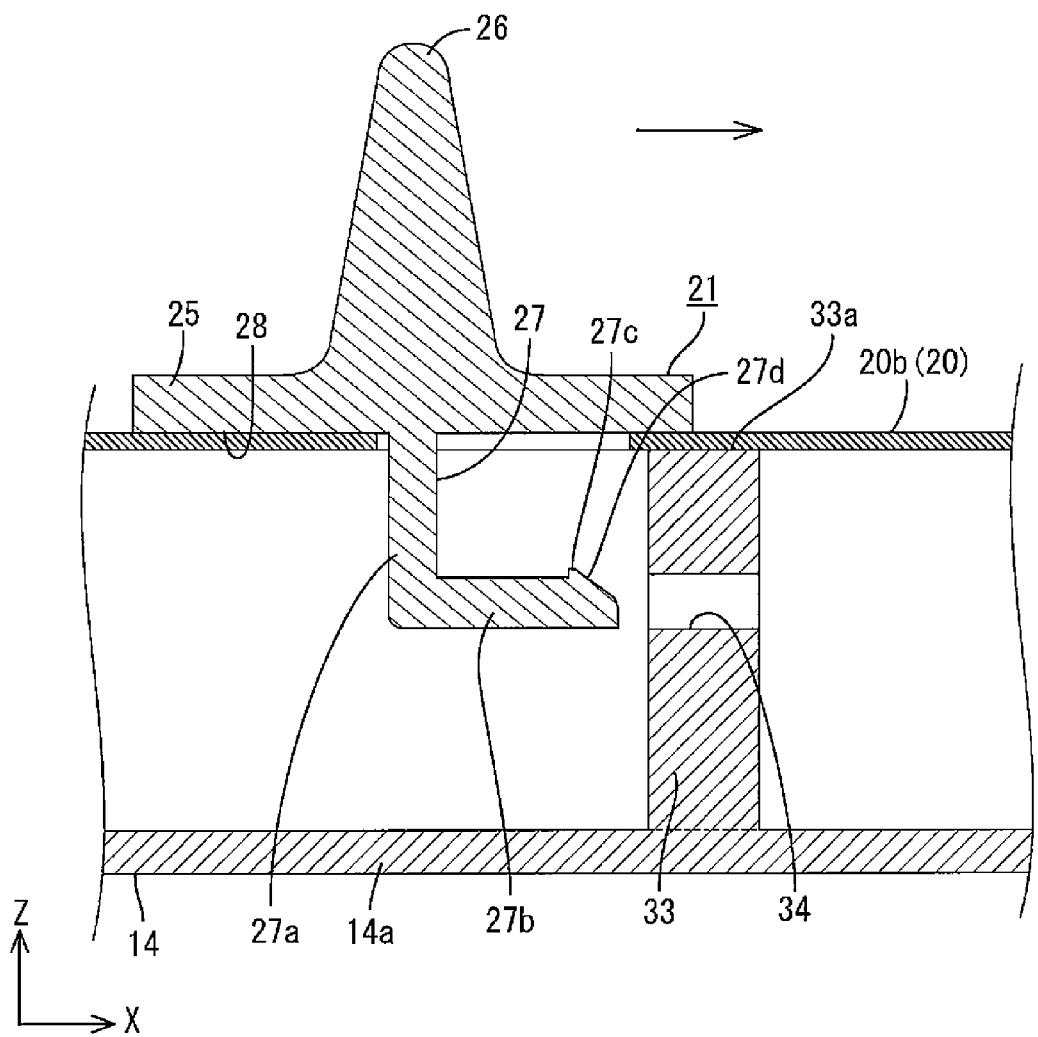
FIG. 10 is a cross section view of FIG. 7 taken along line viii-viii in which the press members are placed in a release position.

FIG. 1 is an exploded perspective view showing a schematic configuration of a television receiver according to the first embodiment of the invention, FIG. 2 is an exploded perspective view showing a schematic configuration of a liquid crystal display device included in the television receiver of FIG. 1, FIG. 3 is a cross section view of the liquid crystal display device of FIG. 2 along a shorter side, FIG. 4 is across section view of the liquid crystal display device of FIG. 2 along a longer side, FIG. 5 is a plane view of a chassis included in the liquid crystal display device of FIG. 2, FIG. 6 is a plane view showing layout of a hot cathode tube and press members in the chassis included in the liquid crystal display panel of FIG. 2, FIG. 7 is a cross section view of FIG. 3 in which major components are enlarged, FIG. 8 is a cross section view of FIG. 7 taken along line viii-viii, FIG. 9 is a cross section view of FIG. 7 taken along line viii-viii in which the press members are not yet attached, and FIG. 10 is across section view of FIG. 7 taken along line viii-viii in which the press members are placed in a release position. In FIGS. 5 and 6, a longer side of the chassis is aligned to an X-axis direction, and a shorter side of the chassis is aligned to a Y-axis direction.

The television receiver TV according to the embodiment is configured to include the liquid crystal display device 10; front and back cabinets Ca and Cb sandwiching and storing the liquid crystal display device 10; a power source P; a tuner T; and a stand S, as shown in FIG. 1. The liquid crystal display device (display device) 10 is a horizontally-long box (rectangular and elongated) as a whole and is stored in portrait orientation. The liquid crystal display device 10 includes a liquid crystal panel 11 as a display panel and a backlight unit (lighting device) 12 as an external light source, and these components are integrally held by a frame-like bezel 13 or the like, as shown in FIG. 2. In the embodiment, the television receiver TV has a screen size of 32 inches with an aspect ratio of 16:9 as an example. More specifically, the horizontal dimension of the screen (along the X-axis direction) is about 698 mm, for example, and the vertical dimension of the screen (along the Y-axis direction) is about 392 mm, for example.

Next, the liquid crystal panel 11 and the backlight unit 12 constituting the liquid crystal display device 10 will be described (refer to FIGS. 2 to 4).

The liquid crystal panel (display panel) 11 is configured such that a pair of glass substrates is attached together with a predetermined gap therebetween and liquid crystal is encapsulated between the glass substrates. One of the glass substrates has a switching component (TFT, for example) connected to a source wiring and a gate wiring perpendicular to each other, pixel electrodes connected to the switching component, an alignment film, and the like. The other glass substrate has color filters in which color sections of R (red), G (green), B (blue), and the like are arranged in predetermined alignment, counter electrodes, an alignment film, and the like. In addition, polarizing plates 11a and 11b are disposed outside the two substrates (refer to FIGS. 3 and 4).

As shown in FIG. 2, the backlight unit 12 includes a substantially box-shaped chassis 14 with an opening 14e on the front side (the light output side and the liquid crystal panel 11 side); an optical member 15 group (a diffuser plate (light diffuser member) 30 and a plurality of optical sheets 31 disposed between the diffuser plate 30 and the liquid crystal panel 11) disposed to cover the opening 14e of the chassis 14; and a frame 16 that is disposed along the longer side of the chassis 14 so as to sandwich and hold a longer side edge portion of the optical member 15 group with the chassis 14. Further, the chassis 14 contains a hot cathode tube 17 as a light source (linear light source); sockets 18 relaying of electrical connection at end portions of the hot cathode tube 17; and a holder 19 covering collectively the end portions of the hot cathode tube 17 and the sockets 18. Moreover, the chassis 14 has a reflection sheet 20 reflecting light laid therein and includes press members 21 pressing the reflection sheet 20 from the front side. The optical member 15 side of the backlight unit 12, not the hot cathode tube 17 side, constitutes the light output side.

The chassis 14 is made of synthetic resin, and is formed by a bottom plate 14a, side plates 14b rising from the end portion of each side of the bottom plate 14a to the front side, and receiving plates 14c jutting outward from the rising end portions of the side plates 14b, and has a substantially shallow box shape as a whole, as shown in FIGS. 3 and 4. The bottom plate 14a has a rectangular shape (elongated) with a longer side and a shorter side aligned to the liquid crystal panel 11 and the optical member 15, and has a range of formation so as to be almost the same in size as the liquid crystal panel 11 and the optical member 15 in a planar view. In addition, the bottom plate 14a has insertion holes for insertion of the sockets 18 at the both end portions along the longer side. The side plates 14b are provided in a pair at both end portions of the bottom plate 14a along the longer side and the shorter side, and the side plates 14b rise from the bottom plate 14a at an almost right angle. The receiving plates 14c each are formed at the side plates 14b, and are bent at an almost right angle with respect to the side plates 14b, and are configured to be in parallel to the bottom plate 14a. The outer end portions of the reflection sheet 20 and the optical member 15 are placed on the receiving plates 14c which are configured to receive these components from the back side. In addition, as shown in FIG. 3, the receiving plate 14c has fixed holes 14d through which the bezel 13, the frame 16, the chassis 14, and others, can be integrated by screws or the like, for example.

The reflection sheet 20 is made of synthetic resin (foam PET, for example), and has a surface of a white color excellent in light reflectivity. As shown in FIG. 2, the reflection sheet 20 is laid on the inner surface of the chassis 14 (surface facing the hot cathode tube 17) so as to cover the almost entire surface. The reflection sheet 20 allows light emitted from the hot cathode tube 17 to be reflected toward the optical member 15. The reflection sheet 20 has a rectangular shape (elongated) with a longer side and a shorter side aligned to the chassis 14 as a whole, and is made symmetrical along the shorter side. The reflection sheet 20 is formed by a bottom portion 20a disposed along the bottom plate 14a of the chassis 14; a pair of rising portions 20b rising from an end of the bottom portion 20a toward the front side (light output side); and a pair of extending portions 20c extending outward from rising ends of the rising portions 20b (opposite to the bottom portion 20a side). As shown in FIGS. 3 and 6, the bottom portion 20a and the pair of rising portions 20b of the reflection sheet 20 are made almost the same size of the bottom plate 14a of the chassis 14 in a planar view, and overlaps the bottom plate 14a in a planar view. In other words, the bottom plate 14a of the chassis 14 is formed over an entire area covered by the bottom portion 20a and the pair of rising portions 20b of the reflection sheet 20 in a planar view. Therefore, the bottom plate 14a is formed in a wider area as compared to the case where the bottom plate of the chassis is formed in an area overlapping only on the bottom portion 20a. The bottom plate 14a formed in the sufficiently wide area can be used to mount a component such as an inverter board 22 or attach a wall mounting (not shown) for wall-hanging of the liquid crystal display device 10, or the like, on the back surface thereof.

Specifically, the bottom portion 20a is disposed on the central side of the bottom plate 14a in the chassis 14 along the shorter side in a planar view (at a position overlapping the central portion 14C), and is configured to be in parallel to the plate surface of the bottom plate 14a. The bottom portion 20a has a rectangular shape (elongated), and has a longer side aligned to the X-axis direction (the longer side of the chassis 14 and the axial direction of the hot cathode tube 17) and a shorter side aligned to the Y-axis direction (the shorter side of the chassis 14). The longer side dimension of the bottom portion 20a is almost the same as the longer side dimension of the bottom plate 14a of the chassis 14, whereas the shorter side dimension of the bottom portion 20a is smaller than the shorter side dimension of the bottom plate 14a, and a proportion of the same is about 3 to 87%, for example. That is, the bottom portion 20a is smaller only in the shorter side than the bottom plate 14a of the chassis 14. In addition, the bottom portion 20a is disposed on the back side of the hot cathode tube 17 (opposite to the light output side) and intervenes between the bottom plate 14a and the hot cathode tube 17.

The pair of rising portions 20b is provided so as to sandwich the bottom portion 20a along the shorter side, and is disposed on both ends (overlapping the both end portions 14A and 14B) of the bottom plate 14a of the chassis 14 along the shorter side in a planar view, as shown in FIGS. 3 and 7. That is, the pair of the rising portions 20b is configured to rise in directions opposite to the both ends of the bottom portion 20a along the longer side. The rising portions 20b are inclined with a specific gradient from the rising base ends (ends on the bottom portion 20a side) to the rising leading ends (opposite to the bottom portion 20a side (extending portion 20c side). The rising portions 20b have plate surfaces inclined with respect to both a Y-axis direction (perpendicular to an axial direction of a support portion 26 described later) and a Z-axis direction (axial direction of the support portion 26 described later), and also inclined with respect to a plate surface of the bottom portion 20a. Rising angle θ1 of the rising portions 20b from the bottom portion 20a (angle of inclination with respect to the plate surface of the bottom portion 20a, angle formed with respect to the Y-axis direction) is preferably an acute angle (not exceeding 90 degrees), more preferably an angle not exceeding 45 degrees, and specifically an angle of about 20 to 30 degrees, for example.

In the reflection sheet 20, the bottom portion 20a extends along an inner surface of the bottom plate 14a of the chassis 14, and hardly creates space between the bottom portions 20a and the bottom plate 14a. On the other hand, the rising portions 20b are configured to rise from the bottom plate 14a while separating from the bottom plate 14a, and thus create space between the rising portions 20b and the bottom plate 14a (FIG. 8), and the space becomes gradually larger from the rising base end side to the rising leading end side. That is, the rising portions 20b are lifted on the front side with the space between the rising portions 20b and the bottom plate 14a. The space forms a substantially triangular shape in a side view (FIG. 3). The rising portions 20b have a rectangular shape (elongated) in a planar view, and have a longer side and a shorter side aligned to those of the bottom portion 20a, as shown in FIG. 6. The longer side dimension of the rising portions 20b is almost the same as the longer side dimension of the bottom plate 14a of the chassis 14, whereas the shorter side dimension of the rising portions 20b is smaller than the shorter side dimension of the bottom plate 14a, and the proportion of the shorter side dimension is about 6.5 to 48.5%, for example. That is, the two rising portions 20b are formed smaller only in the shorter side than the bottom plate 14a of the chassis 14. The area (shorter side dimension) of the rising portions 20b is larger than the area of the bottom portion 20a (shorter side dimension).

The extending portions 20c extend outward from the rising leading ends of the rising portions 20b, and overlap the receiving plates 14c in the chassis 14 in a planar view. The extending portions 20c are in parallel to the plate surface of the bottom portion 20a (the bottom plate 14a and the receiving plates 14c) and are placed on the front surface of the receiving plates 14c. The extending portions 20c are sandwiched between the receiving plates 14c and outer edge portions of the diffuser plate 30.

The chassis 14 has integrally spacers 33 intervened between the rising portions 20b lifted from the bottom plate 14a in the reflection sheet 20 and the bottom plate 14a, as shown in FIGS. 3 and 7. The spacers 33 have a wall-like (plate-like) shape rising from the bottom plate 14a toward the front side (light output side), and have a main wall surface (main plate surface) aligned to the Y-axis direction and a plate thickness direction aligned to the X-axis direction, as shown in FIGS. 3 and 5. In other words, the spacers 33 have a rib shape extending along the Y-axis direction. The spacers 33 are disposed at both end portions of the bottom plate 14a along the shorter side and overlap the rising portions 20b (light source non-placement areas LN) in a planar view, as shown in FIG. 6. The spacers 33 are arranged at five positions separated from each other along the X-axis direction with an almost equal pitch. Of the spacers 33, the spacer 33 in the middle along the X-axis direction is positioned at the center of the chassis 14 along the longer side. The spacers 33 have a substantially triangular shape in cross section cut along the Y-axis direction, and are configured to follow space surrounded by the inclined rising portions 20b, the bottom plate 14a, and the side plates 14b, as shown in FIGS. 3 and 7. The front surfaces of the spacers 33 (surface facing the rising portions 20b) are inclined with respect to both the bottom plate 14a and the side plates 14b (in the Y-axis direction, the Z-axis direction), which constitute receiving surfaces 33a configured to receive part of the rising portions 20b from the back side. The receiving surfaces 33a are configured to extend along (in parallel to) the rising portions 20b. Angle (inclination angle) formed by the receiving surfaces 33a with respect to the bottom plate 14a (along the Y-axis direction and the direction headed from the bottom portion 20a to the rising portions 20b) is substantially identical to the foregoing angle θ1 of rising of the rising portions 20b from the bottom portion 20a (acute angle not exceeding 45 degrees), whereby there hardly exists space between the rising portions 20b and the receiving surfaces 33a of the spacers 33. Parts of the rising portions 20b not overlapping the spacers 33 in a planar view create space between the parts and the bottom plate 14a. The spacers 33 are configured to connect with the inner surfaces of the bottom plate 14a and the side plates 14b, thereby achieving enhancement in strength of the chassis 14.

As shown in FIG. 2, the optical member 15 has a horizontally-long square shape (rectangular) in a planar view, as with the liquid crystal panel 11 and the chassis 14. The optical member 15 intervenes between the liquid crystal panel 11 and the hot cathode tube 17, and is formed by the diffuser plate 30 disposed on the back side (opposite to the hot cathode tube 17 side, the light output side) and an optical sheet 31 disposed on the front side (the liquid crystal panel 11 side, the light output side). The diffuser plate 30 is formed by dispersing a large number of diffusing particles in an almost transparent resin base substrate with a predetermined thickness. The diffuser plate 30 has the function of diffusing transmitted light, and also has the function to reflect light emitted from the hot cathode tube 17 as described later in detail. The optical sheet 31 is formed by a thinner sheet as compared to the diffuser plate 30, and has a three-layered structure. Specifically, the optical sheet 31 has a diffuser sheet, a lens sheet, and a reflection-type polarizing sheet in this order from the diffuser plate 30 side (back side).

The hot cathode tube 17 is tubular (linear) as a whole, and includes a hollow glass tube 17a and a pair of electrodes 17b disposed on both end portions of the glass tube 17a, as shown in FIGS. 3 and 4. The glass tube 17a has mercury and rare gas or the like encapsulated therein and has a fluorescent material coating an inner wall surface thereof. Each of the electrodes 17b includes a filament and a pair of terminals connected to both end portions of the filament. The hot cathode tube 17 has sockets 18 fitted over the both end portions thereof. The foregoing terminals are connected via the sockets 18 to the inverter board 22 attached to the outer surface (back side) of the bottom plate 14a in the chassis 14. The hot cathode tube 17 is supplied with drive power from the inverter board 22, and is configured to control a tube current value, that is, brightness (lighting status) by the inverter board 22. The hot cathode tube 17 intervenes between the diffuser plate 30 and the bottom plate 14a (reflection sheet 20) of the chassis 14, and is disposed closer to the bottom plate 14a of the chassis 14 than the diffuser plate 30. The outer diameter of the hot cathode tube 17 is larger than the outer diameter of a cold cathode tube (about 4 mm, for example), and is about 15.5 mm, for example.

The thus structured hot cathode tube 17 is stored by only one in the chassis 14 such that the length direction (along an axial direction) of the hot cathode tube 17 is aligned to the longer side of the chassis 14, and is positioned at an approximately center of the chassis 14 along the shorter side, as shown in FIG. 6. Specifically, assuming that the bottom plate 14a of the chassis 14 (the part facing the optical member 15 and the hot cathode tube 17) is divided into the first end portion 14A along the shorter side (along the Y-axis direction), the second end portion 14B positioned opposite to the first end portion 14A, and a central portion 14C sandwiched between the first and second end portions, the hot cathode tube 17 is located at the central portion 14C, thereby to form a light source placement area LA. Meanwhile, the hot cathode tube 17 is not placed at the first end portion 14A or the second end portion 14B of the bottom plate 14a, thereby to form light source non-placement areas LN. That is, the hot cathode tube 17 forms the light source placement area LA eccentrically located at the central portion 14C of the bottom plate 14a of the chassis 14 along the shorter side, and the area of the light source placement area LA (the length along the Y-axis direction) is smaller than the area of the light source non-placement areas LN (the length along the Y-axis direction). The ratio of the area of the light source placement area LA (the length along the Y-axis direction) to the area of the entire screen (the vertical dimension of the screen (shorter side dimension)) is about 4%, for example. In addition, the light source non-placement areas LN in a pair have almost the same area.

Part of the bottom portion 20a of the reflection sheet 20 (specifically, the central portion along the shorter side) in a planar view overlaps the central portion 14C of the chassis 14 (light source placement area LA), whereas parts of the bottom portion 20a of the reflection sheet 20 (specifically, the both end portions along the shorter side) and the rising portions 20b overlap the first end portion 14A and the second end portion 14B (light source non-placement areas LN) in a planar view. That is, the main part of the bottom portion 20a is disposed in the light source placement area LA, whereas the partial ends of the bottom portion 20a and the entire rising portions 20b are disposed in the light source non-placement areas LN. In addition, the spacers 33 are provided in the light source non-placement areas LN of the bottom plate 14a. The spacers 33 are located in the light source non-placement areas LN at positions not overlapping the bottom portion 20a in a planar view and at positions overlapping the rising portions 20b in a planar view. In addition, the hot cathode tube 17 is formed such that the length thereof is almost equal to the horizontal dimension (longer side dimension) of the screen.

Holders 19 covering the end portions of the hot cathode tube 17 and the sockets 18, are made of white-colored synthetic resin. As shown in FIG. 2, the holders 19 each have a long and narrow, substantially box-like shape extending along the shorter side of the chassis 14. As shown in FIG. 4, the holders 19 each have a stepped front surface on which the optical member 15 and the liquid crystal panel 11 can be placed in different levels, and overlap the receiving plates 14c of the chassis 14 along the shorter side, thereby to form side walls of the backlight unit 12 together with the receiving plates 14c. The holders 19 have insertion pins 23 protruding from surfaces facing the receiving plates 14c of the chassis 14, and when the insertion pins 23 are inserted into insertion holes 24 in upper surfaces of the receiving plates 14c of the chassis 14, the holders 19 are attached to the chassis 14.

The press members 21 are made of synthetic resin (polycarbonate, for example) and each have an entire surface of white-based color such as white excellent in light reflectivity. The press members 21 are disposed in the chassis 14 at positions overlapping the rising portions 20b of the reflection sheet 20 (the light source overlapping area LA) in a planar view, and have the function of pressing the rising portions 20b from the front side (light output side), as shown in FIG. 2. Further, the press members 21 also have the function of supporting the optical member 15 from the back side (opposite to the light output side).

Specifically, the six press members 21 are intermittently disposed in pairs in parallel in the chassis 14 at the both end portions (the light source non-overlapping areas LN) except for the central portion (the light source overlapping area LA) along the shorter side, three each at the substantially central portion and near the both end portions along the longer side, as shown in FIG. 6. The press members 21 are all disposed in the light source non-placement areas LN of the bottom plate 14a, and overlap the rising portions 20b of the reflection sheet 20 in a planar view. Further, the press members 21 overlap the spacers 33 in a planar view in the light source non-placement areas LN. The press members 21 are arranged so as to overlap the spacers 33 at the central portion of the chassis 14 along the longer side and are arranged so as to overlap the spacers 33 at the both ends of the chassis 14 along the longer side, in a planar view, and are directly mounted to the overlapping spacers 33. The press members 21 and the spacers 33 to which the press members 21 are attached are provided with mounting structures. In addition, the press members 21 are each positioned at an almost center of the spacer 33 along the Y-axis direction (in the direction in which the receiving surfaces 33a extend). Detailed descriptions will be provided below as to relationships among the press members 21, the rising portions 20b of the reflection sheet 20, and the spacers 33 of the chassis 14, and the structure of the press members 21.

The press members 21 include support portions 26 configured to support the optical member 15 from the back side; press portions 25 having press surfaces 28 configured to press the reflection sheet 21 from the front side; and mounting portions 27 constituting the mounting structures described above, as shown in FIGS. 7 and 8. The spacers 33 to which the press members 21 are attached are provided with mounting holes 34 constituting the mounting structures together with the mounting portions 27.

The support portions 26 are configured to protrude from the front surfaces (opposite to the press surfaces 28) of the press portions 25 toward the front side, and have an axis passing over (penetrating) the space in the chassis 14 (between the diffuser plate 30 and the reflection sheet 20). The axial direction of the support portions 26 is aligned to the Z-axis direction (substantially perpendicular to the plate surface of the optical member 15). Therefore, the axis of the support portions 26 forms an almost right angle with respect to the plate surface of the diffuser plate 30. The support portions 26 each have a conical shape, specifically, have a circular shape in cross section along the X-axis direction and the Y-axis direction, and are tapered with gradual decrease in diameter from protruding base ends toward protruding leading ends. Dimension of protrusion of the support portions 26 is almost identical to a distance from the front surfaces of the press portions 25 to the back surface of the diffuser plate 30 almost straight in the X-axis direction and the Y-axis direction. Therefore, the support portions 26 are configured to contact the diffuser plate 30 in an almost straight state. The support portions 26 have protruding leading ends rounded at positions of contact with the diffuser plate 30. The support portions 26 can be said to have a point pattern in a plane of the optical member 15. When the optical member 15 is supported by the support portions 26 from the back side, it is possible to regulate uniformly a positional relationship (distance and space) between the optical member 15 (in particular, the diffuser plate 30) and the hot cathode tube 17 in the Z-axis direction (perpendicular to the plate surface of the optical member 15). This allows the optical member 15 to exhibit desired optical performance in a stable manner.

The press portions 25 have a square plate shape in a planar view (FIG. 6), and back sides of the plate planes constitute the press surfaces 28 with respect to the rising portions 20b of the reflection sheet 20. The press surfaces 28 are configured to incline both in the Y-axis direction (perpendicular to the axial direction of the support portions 26) and the Z-axis direction (axial direction of the support portions 26). Angle (inclination angle) formed by the press surfaces 28 with respect to the Y-axis direction is substantially identical to the angle θ1 of rising of the rising portions 20b from the bottom portion 20a (acute angle not exceeding 45 degrees) and an angle formed by the receiving surfaces 33a of the spacers 33 with respect to the Y-axis direction. Therefore, when the press members 21 are attached to the spacers 33, the rising portions 20b, the receiving surfaces 33a, and the press surfaces 28, become almost in parallel and have hardly space therebetween. That is, the rising portions 20b are received at the receiving surfaces 33a of the spacers 33 from the back side and are pressed by the press surfaces 28 of the press portions 25 from the front side, and thus are unlikely to be displaced from the front side and the back side. In addition, since the press portions 25 are arranged so as to overlap the spacers 33 in a planar view, it is possible to sandwich and hold the rising portions 20b between the press surfaces 28 of the press portions 25 and the receiving surfaces 33a of the spacers 33, which makes it possible to keep the shape of the rising portions 20b in a further stable manner. The dimension of the press portions 25 in the Y-axis direction is smaller than the dimensions of the spacers 33 and the rising portions 20b in the same direction. Therefore, the press portions 25 press partially the rising portions 20b in the Y-axis direction (headed from the bottom portion 20a to the rising portions 20b). In addition, the dimension of the press portions 25 along the X-axis direction (the through-thickness direction of the spacers 33) is larger than the dimension of plate thickness of the spacers 33. Further, the front surfaces of the press portions 25 are almost parallel to the press surfaces 28 on the back side.

Subsequently, the mounting structure for attaching the press portions 21 to the spacers 33 will be described in detail. As shown in FIG. 8, the mounting structure is configured such that, when the press members 21 are slid (moved) with respect to the spacers 33 along the rising portions 20b, the press members 21 is held in a state of being attached to the spacers 33 or is detached from the spacers 33. The mounting portions 27 constituting the mounting structure protrude from the press surfaces 28 of the press portions 25 toward the back side, and have a hook shape along the press surfaces 28. The mounting holes 34 are configured to penetrate the spacers 33 in a through-thickness direction thereof and allow the mounting portions 27 to be inserted thereinto, and the direction of sliding (moving) of the press members 21 during mounting or removal is aligned to the X-axis direction as the through-thickness direction of the spacers 33. The direction of sliding of the press members 21 during mounting or removal is set along the rising portions 20b and perpendicular to both the direction headed from the bottom portion 20a to the rising portions 20b (Y-axis direction) and the axial direction of the support portions 26 (Z-axis direction), and perpendicular to the main wall surfaces of the spacers 33. In addition, the press members 21 are configured to slide along the X-axis direction between an mounting position where the press members 21 are held in a state of being attached by the mounting structure to the spacers 33 (FIG. 8) and a release position (FIG. 10) where the press members 21 are released from the state of being attached by the mounting structure to the spacers 33. In each of FIGS. 8 to 10 where the X-axis direction is indicated as a horizontal direction, a direction headed to the right is a direction of mounting of the press members 21 (direction of movement during mounting) and a direction headed to the left is a direction of removal of the press members 21 (direction of movement during removal).

The structure of the mounting portions 27 will be described in detail. As shown in FIG. 8, the mounting portions 27 include base parts 27a protruding from the press surfaces 28 of the press portions 25 toward the back side; and mounting pieces 27b extending in parallel to the press surfaces 28 from the base parts 27a. The mounting portions 27 have a substantially L shape in cross section as a whole. The base portions 27a have a direction of protrusion from the press portions 25 aligned to the Z-axis direction, that is, aligned to the axial direction of the support portions 26 in an almost concentric manner. The base portions 27a are located at almost centers of the press portions 25, and are arranged so as to overlap the support portions 26 in a planar view and concentric to the support portions 26.

The mounting pieces 27b are configured in a cantilever shape extending in a direction headed from the protruding leading ends of the base portions 27a to the right along the X-axis direction shown in FIG. 8, that is, in the direction of mounting of the press members 21. As shown in FIG. 7, the mounting pieces 27b have main plate surfaces in parallel to the press surfaces 28 (the rising portions 20b) and side surfaces almost aligned to the Z-axis direction to make a plate shape. That is, the main plate surfaces of the mounting pieces 27b on the front and back sides are configured to incline both in the Y-axis direction (perpendicular to the axial direction of the support portions 26) and the Z-axis direction (the axial direction of the support portions 26). Angle (inclination angle) formed by the mounting pieces 27b with respect to the Y-axis direction is substantially identical to the angle θ1 of rising of the rising portions 20b from the bottom portion 20a (acute angle not exceeding 45 degrees) and an angle formed by the receiving surfaces 33a of the spacers 33 with respect to the Y-axis direction. The dimension of extension of the mounting pieces 27b from the base parts 27a is larger than the dimension of plate thickness of the spacers 33. Therefore, when the mounting pieces 27b are inserted into the mounting holes 34, the mounting pieces 27b penetrate the spacers 33 so as to reach the opposite of the insertion side. In addition, the mounting pieces 27b are provided at extending leading ends thereof with protruding portions 34 configured to be locked at edges of the mounting holes 34. The protruding portions 27c are configured to protrude from the main plate surfaces of the mounting pieces 27b on the front side toward the press surfaces 28 (front side). The protruding portions 27c make the press members 21 less prone to be moved by accident from the mounting position in the direction of removal shown in FIG. 8. In addition, the protruding portions 27c are provided with tapered guide surfaces 27d to allow smooth insertion into the mounting holes 34.

In addition, the rising portions 20b of the reflection sheet 20 have insertion holes 29 for insertion of the thus structured mounting portions 27 as shown in FIG. 8. The insertion holes 29 are provided at positions corresponding to the mounting positions of the press members 21 of the rising portions 20b. The insertion holes 29 are slightly larger than the mounting portions 27 in a planar view. The insertion holes 29 are provided in areas not overlapping the spacers 33 in a planar view, and specifically, are disposed on the left side of the spacers 33 shown in FIG. 8, that is, at positions shifted in the removal direction of the press members 21 with respect to the X-axis direction.

The mounting holes 34 are configured to penetrate in almost straight form the spacers 33 along the X-axis direction as shown in FIG. 8, and have cross sections along the Y-axis direction and Z-axis direction following the mounting pieces 27b as shown in FIG. 7. Specifically, the mounting holes 34 have an approximate parallelogram shape in cross section, and of inner circumferential surfaces of the mounting holes 34, main inner surfaces facing the main plate surfaces of the mounting pieces 27b are parallel to the press surfaces 28 (rising portions 20b), and inner side surfaces facing the side surfaces of the mounting pieces 27b are almost aligned to the Z-axis direction. That is, the main inner surfaces of the mounting holes 34 on the front and back sides are configured to incline both along the Y-axis direction (perpendicular to the axial direction of the support portions 26) and Z-axis direction (the axial direction of the support portions 26). Angle (inclination angle) formed by the main inner surfaces with respect to the Y-axis direction is substantially identical to the angle θ1 of rising of the rising portions 20b from the bottom portion 20a (acute angle not exceeding 45 degrees) and the angle formed by the receiving surfaces 33a of the spacers 33 with respect to the Y-axis direction. When the mounting pieces 27b are inserted into the mounting holes 34, the edge portions of the mounting holes 34 at the spacers 33 (specifically, portions on the front side of the mounting holes 34) are sandwiched and held together with the rising portions 20b between the mounting pieces 27b and the press portions 25.

Next, a configuration of the diffuser plate 30 in relation to a light reflecting feature will be described in detail.

Figure 11:
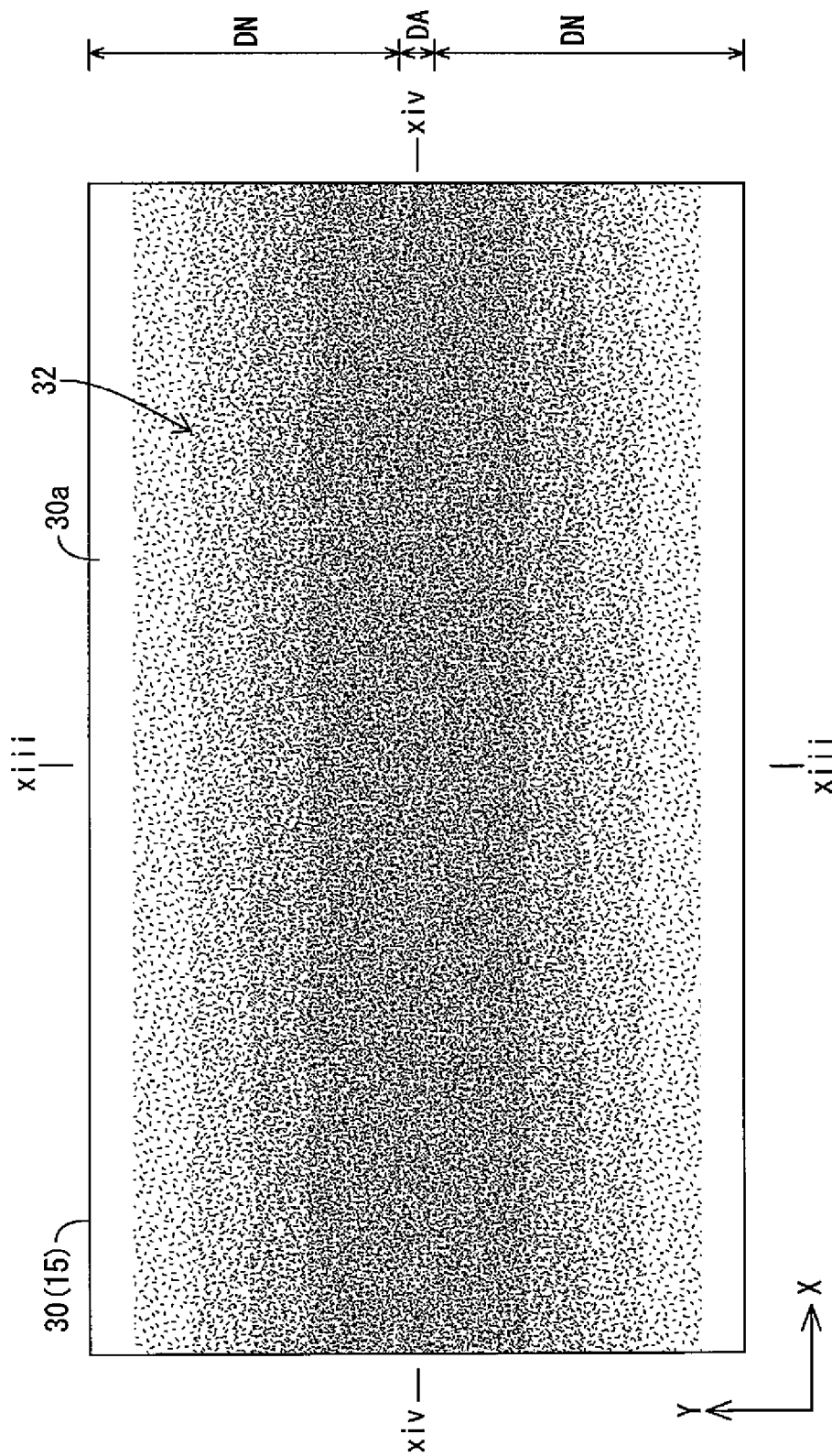
FIG. 11 is a plane view for illustrating distribution of light reflectance in a diffuser plate.
Figure 12:
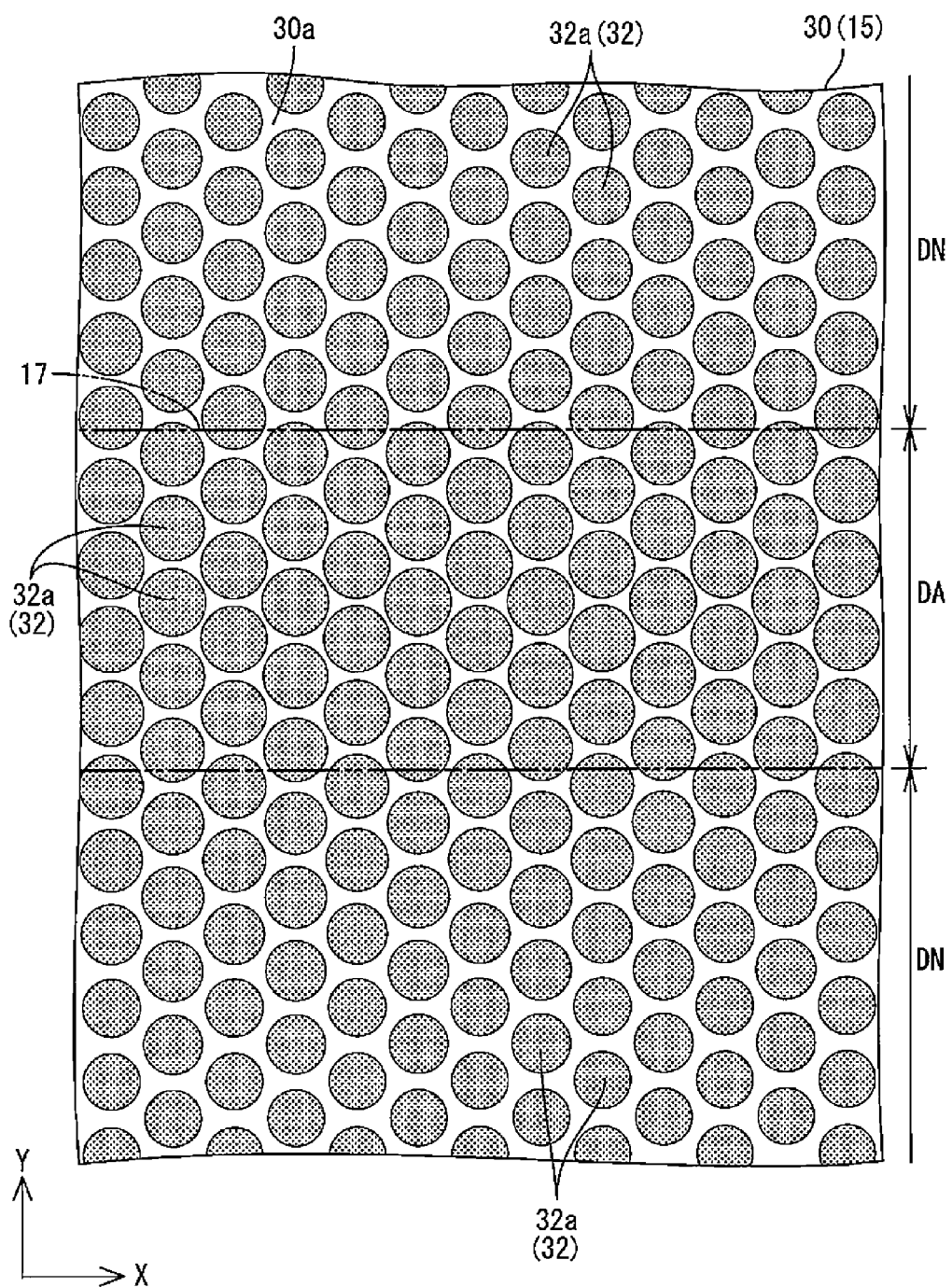
FIG. 12 is an enlarged plane view of main components showing a schematic configuration of a surface of the diffuser plate opposite to the hot cathode tube;
}
Figure 13:
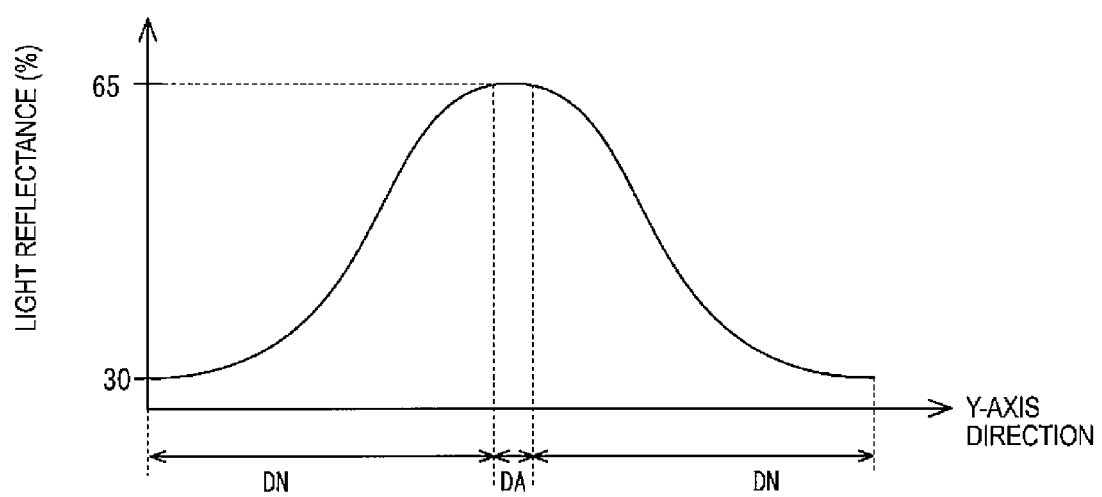
FIG. 13 is a graph showing changes in light reflectance along line xiii-xiii shown in FIG. 11 along a shorter side of the diffuser plate.
Figure 14:
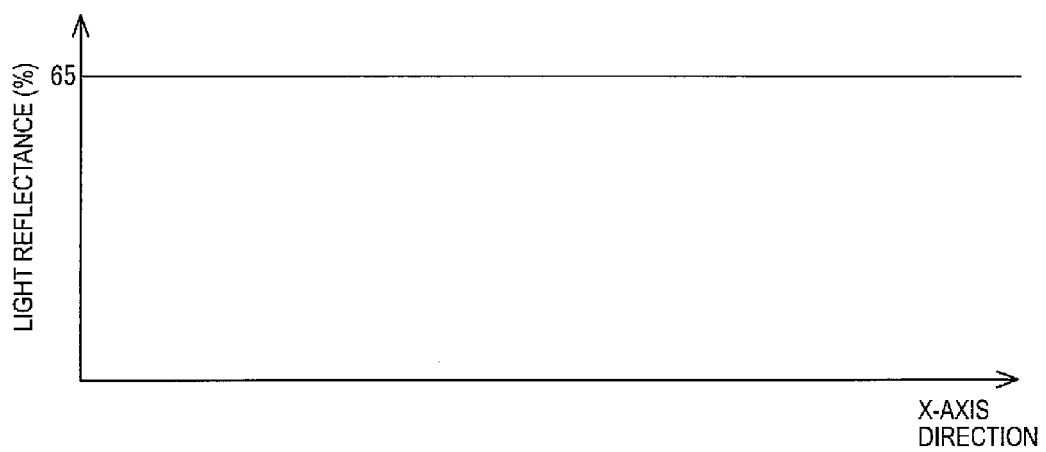
FIG. 14 is a graph showing changes in light reflectance along line xiv-xiv shown in FIG. 11 along a longer side of the diffuser plate.

FIG. 11 is a plane view for illustrating distribution of light reflectance in a diffuser plate, FIG. 12 is an enlarged plane view of main components showing a schematic configuration of a surface of the diffuser plate of FIG. 11 facing the hot cathode tube, FIG. 13 is a graph showing changes in light reflectance on the diffuser plate of FIG. 11 along a shorter side, and FIG. 14 is a graph showing changes in light reflectance on the diffuser plate of FIG. 11 along a longer side. In FIG. 13, the longer side of the diffuser plate is aligned to the X-axis direction, and the shorter side of the same is aligned to the Y-axis direction. FIG. 13 shows a lateral axis indicative of the Y-axis direction (the shorter side) and represents a graph plotting light reflectance along the Y-axis direction from the forward end portion to the backward end portion shown in FIG. 11. Similarly, FIG. 14 shows a lateral axis indicative of the X-axis direction (the longer side) and represents a graph plotting light reflectance along the Y-axis direction from the left end portion to the right end portion shown in FIG. 11.

The diffuser plate 30 is formed by dispersing and mixing a predetermined amount of diffusing particle diffusing light, into an almost transparent base substrate made of synthetic resin (polystyrene, for example), and has almost uniform light transmittance and light reflectance as a whole. Specifically, the light transmittance and light reflectance on the base substrate of the diffuser plate 30 (excluding a light reflecting portion 32 described later) are preferably about 70% and about 30%, respectively, for example. The diffuser plate 30 has a surface facing the hot cathode tube 17 (hereinafter, referred to as first plane 30a) and a surface located opposite to the first plane 30a and facing the liquid crystal panel 11 (hereinafter, referred to as second plane 30b). The first plane 30a is set as a light incident plane into which light from the hot cathode tube 17 is entered, whereas the second plane 30b is set as a light output plane from which light (illumination light) is emitted toward the liquid crystal panel 11.

In addition, the white-colored, dot-patterned light reflecting portion 32 is formed on the first plane 30a constituting the light incident plane of the diffuser plate 30, as shown in FIGS. 11 and 12. The light reflecting portion 32 is formed by arranging a plurality of round dots 32a in a zigzag alignment (staggered and alternating manner) in a planar view. The dot pattern of the light reflecting portion 32 is formed by printing a paste containing a metal oxide, for example, on the surface of the diffuser plate 30. The preferred means for the printing is screen printing, ink-jet printing, or the like. The light reflecting portion 32 has a light reflectance of about 75%, for example, which is larger as compared to in-plane light reflectance of about 30% of the diffuser plate 30. In the embodiment, the light reflectance of each material is an average light reflectance in a measurement diameter of the CM-3700d LAV (with a measurement diameter of φ25.4 mm) manufactured by Konica Minolta Holdings, Inc. In addition, the light reflectance on the light reflecting portion 32 is measured in a manner that the light reflecting portion 32 is formed on one entire surface of a glass substrate and the formation surface is measured by the foregoing measurement means.

The diffuser plate 30 has a longer side (along the X-axis direction) and a shorter side (along the Y-axis direction). As shown in FIG. 13, light reflectance on the first plane 30a facing the hot cathode tube 17 of the diffuser plate 30 changes along the shorter side by changing a dot pattern on the light reflecting portion 32 (refer to FIGS. 11 and 12). That is, the diffuser plate 30 is generally configured such that a part of the first plane 30a overlaps the hot cathode tube 17 (hereinafter, referred to as light source overlapping portion DA) has larger light reflectance than parts of the first plane 30a not overlapping the hot cathode tube 17 (hereinafter, referred to as light source non-overlapping portion DN), as shown in FIG. 11. In addition, light reflectance on the first plane 30a of the diffuser plate 30 hardly varies along the longer side and is maintained almost uniform as shown in FIG. 14 (refer to FIG. 11).

Distribution of light reflectance on the diffuser plate 30 will be described in detail. As shown in FIGS. 11 to 13, light reflectance on the diffuser plate 30 becomes continuously smaller along the shorter side with increasing distance from the hot cathode tube 17, and becomes continuously larger with increasing proximity toward the hot cathode tube 17, and distribution of the light reflectance is normal distribution (drawing a bell-shaped curve). Specifically, the light reflectance on the diffuser plate 30 becomes maximum at a central part thereof along the shorter side (aligned to the center of the hot cathode tube 17), and becomes minimum at both ends thereof along the shorter side. The maximum value of the light reflectance is about 65%, for example, and the minimum value of the same is about 30%, for example, which is equal to the light reflectance of the diffuser plate 30. Therefore, it can be said that the light reflecting portion 32 is less disposed or hardly disposed at the both ends of the diffuser plate 30 along the shorter side.

Due to the foregoing distribution of the light reflectance, the light reflecting portion 32 is formed in a manner as described below. Specifically, the dots 32a constituting the light reflecting portion 32 have a maximum area at the central part of the diffuser plate 30 along the shorter side, that is, the central part of the hot cathode tube 17. The area of the dots 32a becomes gradually smaller with increasing distance from the central part, and becomes smallest at the endmost parts of the diffuser plate 30 along the shorter side. That is, the area of the dots 32a is set smaller with increasing distance from the center of the hot cathode tube 17. According to the thus configured diffuser plate 30, it is possible to obtain gentle brightness distribution of illumination light on the entire diffuser plate 30, and therefore realize gentle brightness distribution of illumination light on the entire backlight unit 12. In addition, as a means for adjusting the light reflectance, the dots 32a of the light reflecting portion 32 may be unified in area but changed in space therebetween.

The embodiment is structured as described above, and subsequently an operation of the embodiment will be described. The liquid crystal display device 10 shown in FIGS. 3 and 4 is manufactured by fabricating separately the liquid crystal panel 11 and the backlight unit 12 and assembling these components by use of a bezel 13 or the like. In the procedure for manufacturing the liquid crystal panel 11, the process of assembly of the backlight unit 12, in particular, mounting of the reflection sheet 20 and the press members 21 to the chassis 14, will be described in detail.

First, after the reflection sheet 20 is laid in the chassis 14 in the state shown in FIG. 2, the press members 21 are attached to the spacers 33 of the chassis 14. Prior to the mounting of the reflection sheet 20, the rising portions 20b are bent with respect to the bottom portion 20a, and the extending portions 20c are bent with respect to the rising portions 20b. When the reflection sheet 20 is housed in the chassis 14, the bottom portion 20a is received by the bottom plate 14a, and the rising portions 20b are received by the receiving surfaces 33a of the spacers 33, and the extending portions 20c are received by the receiving plates 14c.

Subsequently, the press members 21 can be attached while holding the support portions 26 by hand. In the state shown in FIG. 9, the press members 21 are inserted toward the back side along the Z-axis direction to let the mounting portions 27 pass through the insertion holes 29 of the rising portions 20b. When the press members 21 are inserted up to a depth at which the press surfaces 28 come into contact with the rising portions 20b, the press members 21 reach the release positions shown in FIG. 10. Here, the support portions 26 have the axial direction aligned to the Z-axis direction, that is, aligned to the axial direction of the mounting portions 27 and the direction in which the press members 21 are inserted from the removal position shown in FIG. 9 to the release position shown in FIG. 10, thereby resulting in excellent workability during mounting. After that, the press members 21 in the release position are slid along the X-axis direction so as to come closer to the spacers 33 (in the direction shown by an arrow in FIG. 10), that is, in the direction of mounting. In the process of sliding the press members 21 during mounting, the guide surfaces 27d of the protruding portions 27c are slid at the edge portions of the mounting holes 34 to guide introduction of the mounting pieces 27b into the mounting holes 34, whereby the mounting pieces 27b can be smoothly inserted into the mounting holes 34.

When the press members 21 are slid by predetermined dimension from the release position, the press members 21 reach the mounting position shown in FIG. 8, and the mounting pieces 27b penetrate the spacers 33, and the protruding portions 27c protrude outside (opposite to the insertion side in the spacers 33) and are locked at the edge portions of the mounting holes 34. This prevents that the press members 21 are moved by accident from the mounting position in the removal direction (toward the release position), thereby retaining the press members 21. In the mounting position, the parts of the spacers 33 on the front side of the mounting holes 34 and the rising portions 20b of the reflection sheet 20 are sandwiched between the mounting pieces 27b and the press surfaces 28, as shown in FIGS. 7 and 8, and the press surfaces 28 and the receiving surfaces 33a are brought into contact with the rising portions 20b with little space therebetween. Accordingly, the press members 21 in the mounting positions are held so as to hardly be displaced with respect to the spacers 33 (chassis 14) along the Z-axis direction. Further, the rising portions 20b are sandwiched between the press surfaces 28 and the receiving surfaces 33a from the front and back sides, whereby the shape of the rising portions 20b are kept uniform.

Here, since the direction of sliding of the press members 21 during mounting according to the embodiment is the direction along the rising portions 20b, the press surfaces 28 are hardly displaced with respect to the front or back side of the rising portions 20b. Therefore, even if the amount of sliding from the release position is insufficient, the press surfaces 28 are brought into contact with the rising portions 20b and are held in a state of being pressed from the front side. More specifically, the direction of sliding of the press members 21 during mounting is perpendicular to the X-axis direction, that is, the direction headed from the bottom portion 20a to the rising portions 20b (along the Y-axis direction), the press members 21 are hardly displaced along the Y-axis direction at sliding. As in the foregoing, it is unlikely to generate shift in the positions of pressing on the press portions 20b by the press surfaces 28, which makes it possible to press appropriately the rising portions 20b in desired positions by the press surfaces 28. Accordingly, it is possible to maintain the shape of the rising portions 20b stably in a desired shape.

In addition, since the mounting pieces 27b and the mounting holes 34 are both inclined in parallel to the rising portions 20b (FIG. 7), even if the press members 21 slip slightly with respect to the spacers 33 due to clearance between the mounting pieces 27b and the mounting holes 34, the positions of pressing on the rising portions 20b by the press surfaces 28 are unlikely to change. More specifically, if the mounting pieces and the mounting holes are configured along the Y-axis direction, for example, the press members may slip due to the clearance in two directions: the Y-axis direction and the Z-axis direction, in either of which the positions of pressing on the rising portions 20b by the press surfaces may change. As compared to this, in the embodiment, even if there is clearance between the mounting pieces 27b and the mounting holes 34, the press members 21 may slip due to the clearance in two directions: the inclination direction (the direction of rising of the rising portions 20b from the bottom portion 20a) and the Z-axis direction. Of the two directions, the positions of pressing on the rising portions 20b by the press surfaces 28 do not change in the inclination direction. Therefore, even if the press members 21 slip slightly due to clearance between the mounting pieces 27b and the mounting holes 34, the press surfaces 28 are less prone to be displaced so as to contact the rising portions 20b or separate from the rising portions 20b, thereby making it possible to press the rising portions 20b in a more stable manner.

It is difficult to control the bending angle of the bending portions of the reflection sheet 20 so as to be constantly uniform, and therefore there is a possibility that the bending angle may have excess or deficiency. For example, if the bending angle (rising angle) of the rising portions 20b with respect to the bottom portion 20a is larger than a set value, the rising portions 20b may be lifted with space between the rising portions 20b and the receiving surfaces 33a of the spacers 33. Even in that case, the rising portions 20b are pressed from the front side by the press surfaces 28 of the press members 21 and the lift of the rising portions 20b is corrected, whereby the rising angle from the bottom portions 20a is returned to the set value.

After the reflection sheet 20 and the press members 21 are attached to the chassis 14, the hot cathode tube 17 and the holders 19 with the sockets 18 are housed in the chassis 14, and then the diffuser plate 30 and the optical sheet 31 constituting the optical member 15 are sequentially attached to the opening 14e and then the frame 16 is attached, whereby the backlight unit 12 is completely assembled.

In use of the thus manufactured liquid crystal display device 10, when the hot cathode tube 17 is turned on, light emitted from the hot cathode tube 17 enters directly the first plane 30a of the diffuser plate 30 or is reflected by the components disposed in the chassis 14 (the holders 19, the reflection sheet 20, the press members 21, and the like) and then enter indirectly the first plane 30a of the diffuser plate 30. After passing through the diffuser plate 30, the light is output toward the liquid crystal panel 11 via the optical sheet 31.

Here, the indirect light traveling toward the diffuser plate 30 is basically reflected by the reflection sheet 20 laid in the almost entire chassis 14 (refer to FIGS. 2 and 6). Since the rising portions 20b of the reflection sheet 20 disposed in the light source non-placement areas LN, are configured to rise from the bottom portion 20a toward the front side in the light source placement area LA as shown in FIGS. 3 and 7, the space between the rising portions 20b and the diffuser plate 30, that is, the space in which light is exchanged in the chassis 14, becomes gradually narrower from the rising base ends to the rising leading ends. Here, the quantity of light in the chassis 14 tends to be substantially inversely proportional to the distance from the hot cathode tube 17, and tends to be smaller in the light source non-placement areas LN than the light source placement area LA, and therefore, the light source non-placement areas LN are prone to generate dark sections. In this regard, in the embodiment, the space in which light is exchanged by the rising portions 20b in the light source non-placement areas LN that tend to be smaller in light quantity, is made narrow, and the space is angled by the rising portions 20b such that reflected light is directed toward the center of the screen, which makes the light source non-placement areas LN less prone to be recognized as dark sections. In addition, the press portions 25 of the press members 21 are sized so as to press partially the rising portions 20b along the shorter side (along the Y-axis direction), which are made smaller in size as compared to the case where the press portions 25 are sized so as to press the rising portions over the entire length, and the surface area of the press portions 25 is smaller in proportion of the chassis 14 as compared to the reflection sheet 20. Therefore, even if light reflectance is different between the reflection sheet 20 and the press members 21, it is less prone to generate unevenness in light reflectance and reflected light in the chassis 14.

Subsequently, the function of light reflection performed by the diffuser plate 30 will be described in detail. The first plane 30a of the diffuser plate 30 into which light emitted from the hot cathode tube 17 enters, has the light reflecting portion 32 with in-plane light reflectance varying by area as shown in FIG. 11, which makes it possible to control appropriately the light incident efficiency for each area. Specifically, the light source overlapping portion DA of the first plane 30a overlapping the hot cathode tube 17 receives much direct light from the hot cathode tube 17 and thus has relatively larger quantity of light than that in the light source not-overlapping portions DN. Accordingly, by making the light reflectance of the light reflecting portion 32 relatively large at the light source overlapping portion DA (refer to FIGS. 11 and 13), it is possible to suppress (regulate) the incidence of light on the first plane 30a and reflect and return more light to the chassis 14. On the other hand, the light source non-overlapping portions DN of the first plane 30a not overlapping on the hot cathode tube 17 receive less direct light from the hot cathode tube 17, and thus have relatively smaller quantity of light than that in the light source overlapping portion DA. Accordingly, by making the light reflectance of the light reflecting portion 32 relatively small at the light source non-overlapping portions DN (refer to FIGS. 11 and 13), it is possible to facilitate incidence of light on the first plane 30a. At that time, light reflected toward the chassis 14 by the light reflecting portion 32 of the light source overlapping portion DA is guided by the reflection sheet 20 or the like to the light source non-overlapping portions DN for compensating the quantity of light, which makes it possible to provide sufficient quantity of light incident on the light source non-overlapping portions DN.

When the hot cathode tube 17 is turned on or turned off, temperature environment in the chassis 14 may change to cause thermal expansion or thermal contraction of the reflection sheet 20 disposed in the chassis 14. Of the reflection sheet 20, the bottom portion 20a disposed along the bottom plate 14a of the chassis 14 is kept in a relatively uniform shape as shown in FIGS. 3 and 7, whereas the rising portions 20b are inclined with respect to the bottom portion 20a and have space between the rising portions 20b and the bottom plate 14a, and thus are prone to be unstable in shape. Specifically, the rising portions 20b may cause warpage or flexion due to thermal expansion or thermal contraction of the reflection sheet 20, and thus the rising portions 20b may be deformed (displaced) so as to come closer to the diffuser plate 30. In this regard, in the embodiment, the rising portions 20b are pressed from the front side by the press surfaces 28 of the press portions 25 in the press members 21 and are received from the back side by the receiving surfaces 33a of the spacers 33, which suppresses deformation of the rising portions 20b so as to contact or separate from the diffuser plate 30.

Specifically, the rising portions 20b are pressed both from the front and back sides by the press members 21 and the spacers 33. Therefore, displacement of the rising portions 20b is suppressed both on the front and back sides, which makes it possible to keep the shape of the rising portions 20b in a stable manner. The press members 21 and the spacers 33 are configured to press partially the rising portions 20b in a surface thereof, but these members and portions are distributed by a plurality in surfaces of the rising portions 20b, thereby to press (receive) the entire rinsing portions in a stable manner. In addition, the rising portions 20b are partially sandwiched between the press members 21 and the spacers 33, which makes it possible to keep the shape of the rising portions 20b in a stable manner. As in the foregoing, the shape of the rising portions 20b can be stabilized, thereby to stabilize the direction of light reflected on the rising portions 20b. This makes it less prone to generate unevenness in light output to the outside of the backlight unit 12 after radiated to the diffuser plate 30.

As is described above, the backlight unit 12 of the embodiment includes the hot cathode tube 17 as a light source; the chassis 14 having the bottom plate 14a opposite to the light output side of the hot cathode tube 17 and housing the hot cathode tube 17; the reflection sheet 20 having the bottom portion 20a disposed along the bottom plate 14a and the rising portions 20b rising from the bottom portion 20a toward the light output side for reflecting light; the spacers 33 intervening between the bottom plate 14a and the rising portions 20b; and the press members 21 having the press surfaces 28 pressing the rising portions 20b from the light output side. The press members 21 and the spacers 33 are provided with the mounting structures (the mounting pieces 27b of the mounting portions 27 and the mounting holes 34) configured to hold the press members 21 in a state of being attached to the spacers 33 by moving the press members 21 with respect to the spacers 33 in the direction along the rising portions 20b.

The rising portions 20b of the reflection sheet 20 are configured to rise from the bottom portion 20a toward the light output side, and therefore tend to be unstable in shape because the angle of rising from the bottom portion 20a changes or the rising portions 20b deform due to warpage or flexion, for example. In this regard, according to the embodiment, the rising portions 20b are pressed from the light output side by the press surfaces 28 of the press members 21, which makes it possible to suppress displacement of the rising portions 20b toward the light output side. Accordingly, this makes it possible to suppress variations of angle of rising of the rising portion 20b with respect to the bottom portion 20a, and also suppress generation of deformation of the rising portion 20b due to warpage or flexion. That is, the rising portions 20b can be held in a stable form to stabilize the direction of light reflected there, which makes it less prone to generate unevenness in light emitted from the backlight unit 12.

Further, when the press members 21 according to the embodiment are moved in the direction along the rising portions 20b with respect to the spacers 33 intervening between the rising portions 20b of the reflection sheet 20 and the bottom plate 14a of the chassis 14, the press members 21 are held in a state of being attached by the mounting structures to the spacers 33. The direction of the movement of the press members 21 during mounting is set along to the rising portions 20b, the press surfaces 28 are unlikely to be displaced during mounting toward the light output side and the opposite side with respect to the rising portions 20b. That is, the positions of pressing on the rising portions 20b by the press surfaces 28 are unlikely to shift, which makes it possible to press the rising portions 20b more appropriately by the press surfaces 28. Therefore, the shape of the rising portions 20b can be kept in a more stable manner, thereby more effectively suppressing generation of unevenness in output light.

In addition, the spacers 33 have a wall-like shape rising from the bottom plate 14a, and the direction of movement of the press members 21 during mounting is set along the through-thickness direction of the spacers 33. Accordingly, the press members 21 can be attached by moving with respect to the wall-like spacers 33 along the through-thickness direction.

In addition, the mounting structures are formed by the mounting pieces 27b disposed at the press members 21 and configured to extend along the through-thickness direction and the mounting holes 34 configured to penetrate the spacers 33 in the through-thickness direction and allowing insertion of the mounting pieces 27b. Accordingly, when the press members 21 are moved during mounting with respect to the spacers 33 in the through-thickness direction, the mounting pieces 27b are inserted into the mounting holes 34 of the spacers 33 to thereby attach the press members 21. When the rising portions 20b and the edge portions of the mounting holes 34 of the spacers 33 are both sandwiched between the mounting pieces 27b and the press surfaces 28, the press members 21 can be held and the rising portions 20b can be pressed.

In addition, the mounting pieces 27b are provided with the protruding portions 27c held to the edge portions of the mounting holes 34. Accordingly, when the protruding portions 27c are held to the edge portions of the mounting holes 34, the press members 21 can be held so as not to come off from the spacers 33. This makes it possible to press the rising portions 20b by the press surfaces 28 in a more stable manner.

In addition, the mounting pieces 27b and the mounting holes 34 are both configured to be in parallel to the rising portions 20b. Accordingly, even if there exist any clearance and backlash between the mounting pieces 27b and the mounting holes 34, the position of pressing on the rising portions 20b by the press surfaces 28 is unlikely to change. Therefore, it is possible to press the rising portions 20b by the press surfaces 28 in a further appropriate manner.

The direction of movement of the press members 21 during mounting is substantially perpendicular to the direction headed from the bottom portion 20a to the rising portions 20b. Accordingly, when the press members 21 are moved during mounting, the press members 21 are hardly moved in the direction headed from the bottom portion 20a to the rising portions 20b (X-axis direction). Therefore, the position of pressing on the rising portions 20b by the press surfaces 28 is further unlikely to shift, which makes it possible to press the rising portions 20b by the press surfaces 28 in a more appropriate manner.

The spacers 33 have receiving surface 33a configured to receive the rising portions 20b from the side opposite to the light output side. Accordingly, the rising portions 20b can be pressed from both the light output side and the side opposite to the light output side, by the receiving surfaces 33a of the spacers 33 and the press surfaces 28 of the press members 21. This makes it possible to keep the shape of the rising portions 20b in a more stable manner.

The rising portions 20b have insertion holes 29 into which the mounting portions 27 as the mounting structures can be inserted. Accordingly, when the mounting portions 27 are inserted into the insertion holes 29, the press members 21 are mounted to the spacers 33.

The optical members 15 on the light output side with respect to the hot cathode tube 17, and the press members 21 have an axis passing across space in the chassis 14 and support portions 26 supporting the optical member 15 from the side opposite to the light output side. Accordingly, the press members 21 can also perform the function of supporting the optical member 15 from the side opposite to the light output side.

The rising portions 20b and the press surfaces 28 are configured to intersect with both the axial direction of the support portions 26 and the direction perpendicular to the axial direction (plate plane of the optical member 15, surface perpendicular to the axial direction). Accordingly, the rising portions 20b configured to intersect with both the axial direction of the support portions 26 and the direction perpendicular to the axial direction can be pressed by the press surfaces 28 from the light output side in an appropriate manner. This makes it possible to keep the shape of the reflection sheet 20 in a stable manner and stabilize the direction of light reflected there, which makes it less prone to generate unevenness in light output from the backlight unit 12.

Angles formed by the rising portions 20b and the press surfaces 28 with respect to the direction perpendicular to the axial direction are substantially equal. Accordingly, the rising portions 20b can be pressed in a reliable manner by the press surfaces 28 of the press members 21, thereby achieving excellent shape stability.

The angles formed by the rising portions 20b and the press surfaces 28 with respect to the direction perpendicular to the axial direction are both acute angles. Accordingly, light reflected on the rising portions 20b is angled in accordance with the angle of rising from the bottom portions 20a. When the angle of rising is set as an acute angle, light can be output in a favorable manner. The rising portions 20b with the acute rising angle can be appropriately pressed by the press surfaces 28 with the acute angle with respect to the direction perpendicular to the axial direction.

The rising portions 20b and the press surfaces 28 are both inclined. Accordingly, the inclined rising portions 20b can be appropriately pressed by the similarly inclined press surfaces 28.

The axial direction of the support portions 26 is substantially perpendicular to a plate surface of the optical member 15. Accordingly, the optical member 15 can be appropriately supported by the support portions 26. This makes the support portions 26 less prone to be recognized as a dark section through the optical member 15, which is more preferably suited for suppression of uneven brightness.

The press members 21 are formed such that the press surfaces 28 press partially the rising portions 20b in the direction headed from the bottom portion 20a to the rising portions 20b. Accordingly, the press members 21 can be reduced in size as compared to the arrangement where the press members 21 press the rising portions 20b over the entire length. Therefore, even if light reflectance is different between the reflection sheet 20 and the press members 21, it is possible to make it less prone to generate uneven light reflectance in the chassis 14.

The bottom plate 14a has side plates 14b rising toward the light output side at end portions thereof, the side plates 14b have receiving plate 14c jutting outward at rising ends thereof, and the rising portions 20b have extending portions 20c extending along the receiving plates 14c at rising ends thereof. Accordingly, in the reflection sheet 20, the bottom portion 20a is disposed along the bottom plate 14a, and the extending portions 20c are disposed along the receiving plates 14c. This makes it possible to stabilize the shape of the rising portions 20b positioned between the bottom portion 20a and the extending portions 20c.

The chassis 14 is divided into the light source placement area LA where the hot cathode tube 17 is disposed and the light source non-placement areas LN where the hot cathode tube 17 is not disposed. Accordingly, the chassis 14 includes the light source non-placement area LN where the hot cathode tube 17 is not disposed, which decreases the number of the hot cathode tubes 17 as compared to the case where the hot cathode tube 17 is evenly disposed in the entire chassis 14, thereby realizing cost reduction and power saving on the backlight unit 12.

The chassis 14 is divided into at least the first end portion 14A, the second end portion 14B positioned opposite to the first end portion 14A, and the central portion 14C sandwiched between the first end portion 14A and the second end portion 14B. The central portion 14C constitutes the light source placement area LA, and the first end portion 14A and the second end portion 14B constitute the light source non-placement areas LN. Accordingly, it is possible to provide sufficient brightness at the central portion of the backlight unit 12 and thus also provide the brightness of the display central portion in the liquid crystal display device 10 including the backlight unit 12, thereby achieving favorable viewability.

At least part of the bottom portion 20a is disposed in the light source placement area LA, whereas at least parts of the rising portions 20b are disposed in the light source non-placement areas LN. Quantity of light in the chassis 14 tends to be smaller in the light source non-placement areas LN as compared to the light source placement area LA. However, when the rising portions 20b rising from the bottom portion 20a toward the light output side is disposed in the light source non-placement areas LN, it is possible to make it less prone to generate a dark section in the light source non-placement areas LN. This makes it possible to suppress uneven brightness.

The optical member 15 is disposed on the light output side with respect to the hot cathode tube 17, and at the diffuser plate 30 as the optical member 15, light reflectance at least on the first plane 30a facing the hot cathode tube 17 is larger at parts overlapping the light source non-placement areas LN (light source non-overlapping portions DN) than a part overlapping the light source placement area LA (light source overlapping portion DA). Accordingly, Light emitted from the hot cathode tube 17 first reaches a part of the optical member 15 with a relatively high light reflectance, and therefore most of the light is reflected (that is, not transmitted), whereby brightness of illumination light is suppressed with respect to quantity of light emitted from the hot cathode tube 17. Light reflected there can be reflected in the chassis 14 so as to reach the light source non-placement areas LN. The parts of the optical member 15 overlapping the light source non-placement areas LN have relatively small light reflectance, and therefore let much more light pass through, thereby achieving desired brightness of illumination light.

The diffuser plate 30 has light reflectance at least in the first plane 30a facing the hot cathode tube 17 that becomes smaller with increasing distance from the hot cathode tube 17. Accordingly, it is possible to unify brightness of illumination light in the light source placement area LA and the light source non-placement areas LN.

The press members 21 have surfaces of a white color. Accordingly, the surface of the press members 21 can reflect light favorably, which makes it possible to effectively use light emitted from the hot cathode tube 17.

The light source is formed by the hot cathode tube 17. This achieves high brightness and the like.

The first embodiment of the invention is described above, but the invention is not limited to the foregoing embodiment, and may include modification examples as shown below. In the following descriptions of the modification examples, the same components as those in the foregoing embodiment are given the same reference numerals and are not described or illustrated here.

Modification Example 1 of the First Embodiment

Figure 15:
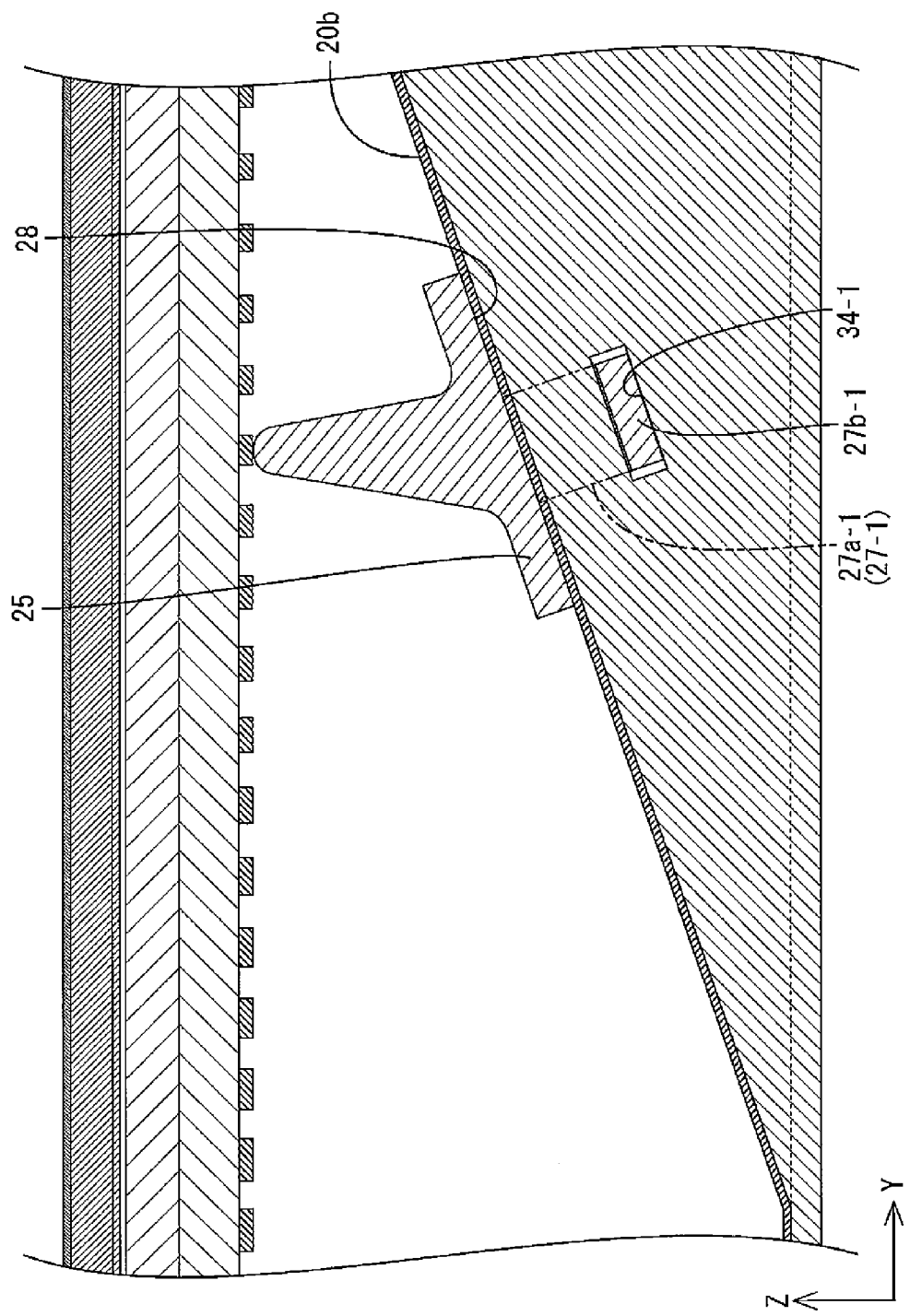
FIG. 15 is a cross section view of a press member and a reflection sheet according to a modification example 1 of the first embodiment in which major components are enlarged.

Modification example 1 of the first embodiment will be described with reference to FIG. 15. In this context, mounting portions 27-1 and mounting holes 34-1 are modified in shape. FIG. 15 is a cross section view with enlarged major components of press members, a reflection sheet and a spacer according to a modification example 1 of the first embodiment.

The mounting portions 27-1 have base parts 27a-1 protruding from the press surfaces 28 of the press portions 25 so as to be inclined with respect to the Z-axis direction, as shown in FIG. 15. Angle formed by the axial direction (protruding direction) of the base portions 27a-1 with respect to the press surfaces 28 is an almost right angle. The mounting pieces 27b-1 have main plate surfaces configured to be parallel to the press surfaces 28 and the rising portions 20b, and have side surfaces configured to be parallel to the axial direction of the base portions 27a-1. In addition, the mounting holes 34-1 have the same shape in cross section as the mounting pieces 27b-1.

Modification Example 2 of the First Embodiment

Figure 16:
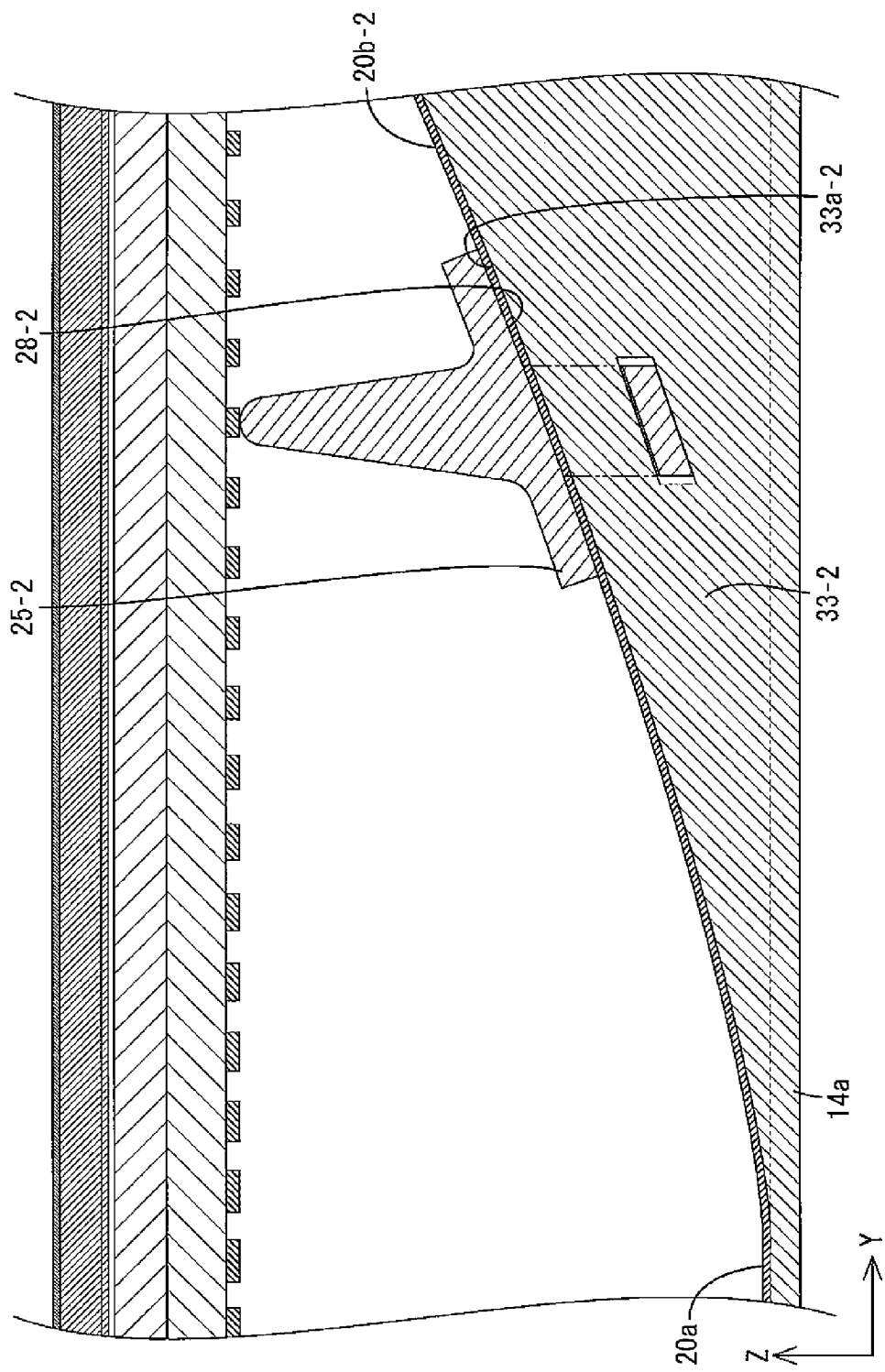
FIG. 16 is a cross section view of a press member and a reflection sheet according to a modification example 2 of the first embodiment in which major components are enlarged.

Modification example 2 of the first embodiment will be described with reference to FIG. 16. In this context, rising portions 20b-2, press portions 25-2, and spacers 33-2, are modified in shape. FIG. 16 is a cross section view with enlarged major components of press members, a reflection sheet, and spacers according to the modification example 2 of the first embodiment.

All of the rising portions 20b-2, the press portions 25-2, and the spacers 33-2, have a substantially arc shaped cross section (arched cross section), as shown in FIG. 16. Specifically, the rising portions 20b-2 are formed in a backward curved arc shape, and are disposed as a whole nearer to the bottom plate 14a than a line (string) linking the rising base ends and the rising leading ends. The rising portions 20b-2 form an angle of rising from the bottom portion 20a, which is almost the same as that in the first embodiment 1. The rising angle is formed by a tangent line at the rising base ends of the rising portions 20b-2 with respect to the bottom portion 20a. The press portions 25-2 and the spacers 33-2 have cross sections with almost the same curvature as that of the rising portions 20b-2, and have press surfaces 28-2 and receiving surfaces 33a-2 formed in a substantially arc shape along the rising portions 20b-2. Angles formed by the press surfaces 28-2 and the receiving surfaces 33a-2 with respect to the Y-axis direction are almost the same as the rising angle of the rising portions 20b-2. As in the foregoing, even if the rising portions 20b-2 are curved in an arc-like shape, the shape of the rising portions 25b-2 can be appropriately kept by forming the press portions 25-2 and the spacers 33-2 in a similar shape.

Modification Example 3 of the First Embodiment

Figure 17:
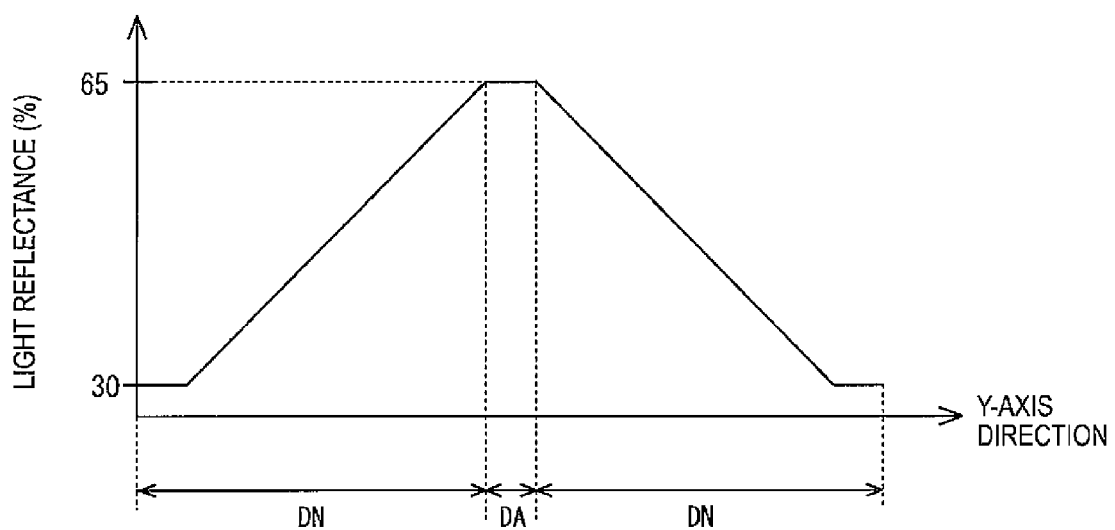
FIG. 17 is a graph showing changes in light reflectance on the diffuser plate along a shorter side according to modification example 3 of the first embodiment.

Modification example 3 of the first embodiment will be described with reference to FIG. 17. In this modification example, the first plane 30a of the diffuser plate 30 is modified in distribution of light reflectance. FIG. 17 is a graph showing changes in light reflectance on the diffuser plate along the shorter side according to the modification example 3 of the first embodiment.

In the first plane 30a of the diffuser plate 30, the light source overlapping portion DA generally has a uniform light reflectance of 65%, for example, which is the maximum value in the diffuser plate 30, as shown in FIG. 17. The light source non-overlapping portions DN have alight reflectance that becomes continuously smaller by degrees (in a sloped manner) with increasing distance from the light source overlapping portion DA and is 30% which is the minimum value at both ends of the diffuser plate 30 along the shorter side (Y-axis direction). The dots 32a constituting the light reflecting portion 32 are formed so as to be largest and uniform in area in the light source overlapping portion DA and become continuously smaller in area by degrees in the light source non-overlapping portion DN in inverse proportion to a distance from the light source overlapping portion DA.

Modification Example 4 of the First Embodiment

Figure 18:
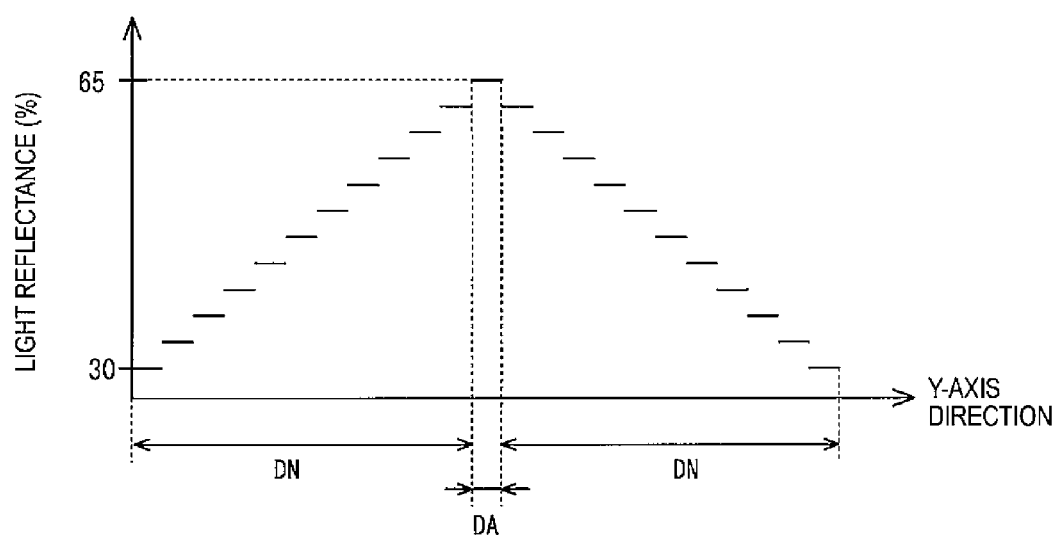
FIG. 18 is a graph showing changes in light reflectance on the diffuser plate along a shorter side according to modification example 4 of the first embodiment.

Modification example 4 of the first embodiment will be described with reference to FIG. 18. In this modification example, distribution of light reflectance in the first plane 30a of the diffuser plate 30 is further modified. FIG. 18 is a graph showing changes in light reflectance at the diffuser plate along the shorter side according to the modification example.

The light reflecting portion 32 is formed such that light reflectance on the first plane 30a of the diffuser plate 30 becomes continuously smaller by degrees from the light source overlapping portion DA to the light source non-overlapping portions DN as shown in FIG. 18. Specifically, the area of the dots 32a (light reflectance) constituting the light reflecting portion 32 is largest and uniform at the light source overlapping portion DA, and becomes continuously smaller by degrees for each predetermined area with increasing distance from the light source overlapping portion DA, and is smallest at both end portions of the diffuser plate 30 along the shorter side (in the Y-axis direction). That is, in the light source non-overlapping portions DN of the light reflecting portion 32, the light reflectance changes in a striped shape along the shorter side of the diffuser plate 30 (in the Y-axis direction). This configuration makes it possible to moderate distribution of brightness of illumination light emitted from the diffuser plate 30. Further, according to the means for forming a plurality of areas with stepwise changes in light reflectance, it is possible to simplify the method for manufacturing the diffuser plate 30, thereby contributing to cost reduction.

Second Embodiment

Second embodiment of the invention will be described with reference to FIG. 19 or 22. In the second embodiment, spacers 133 are modified in structure and press members 121 are modified in mounting structure. The same structures, operations and advantages as those in the first embodiment are not described here.

Figure 19:
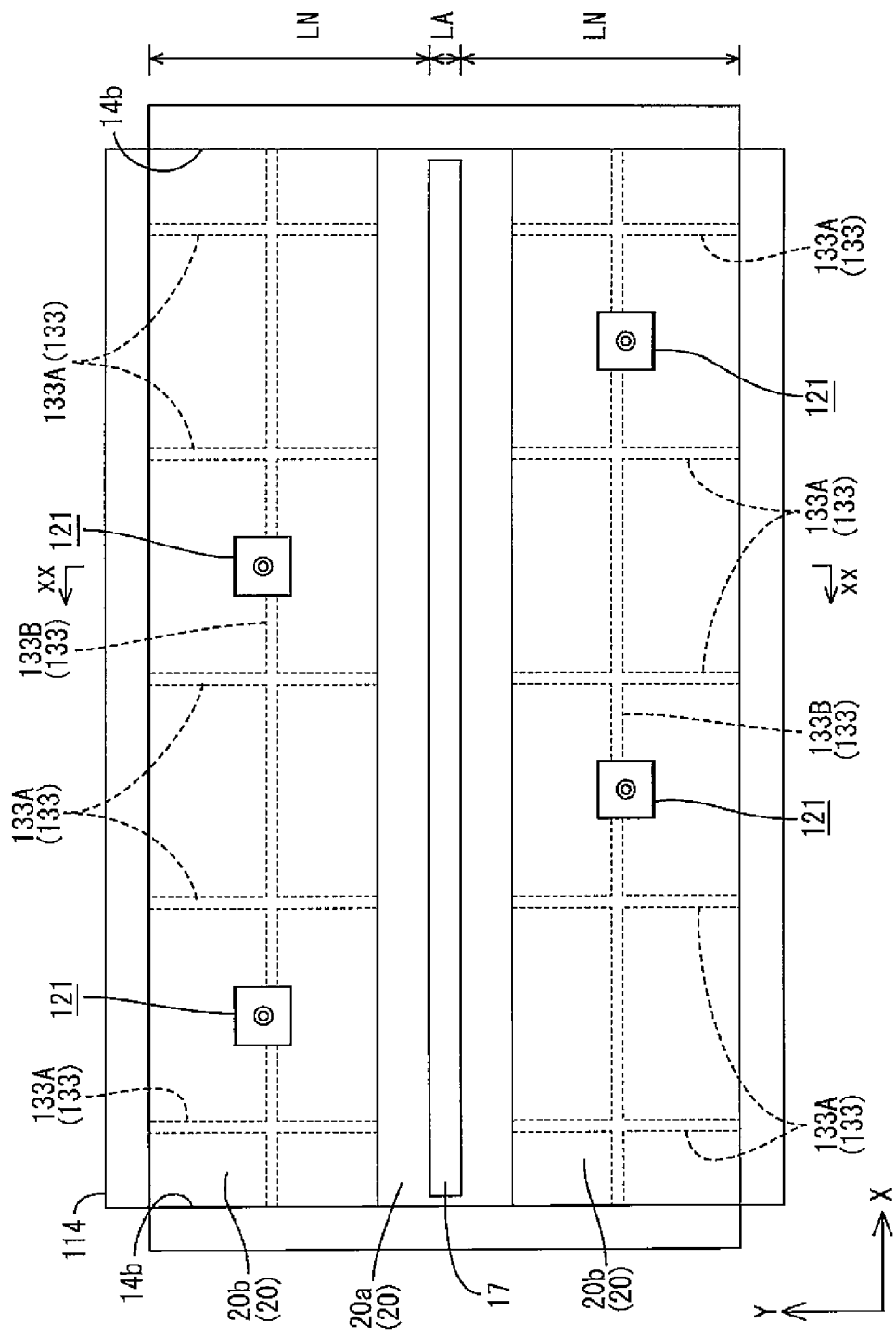
FIG. 19 is a plane view showing layout of a hot cathode tube and press members in a chassis of a second embodiment of the invention.
Figure 20:
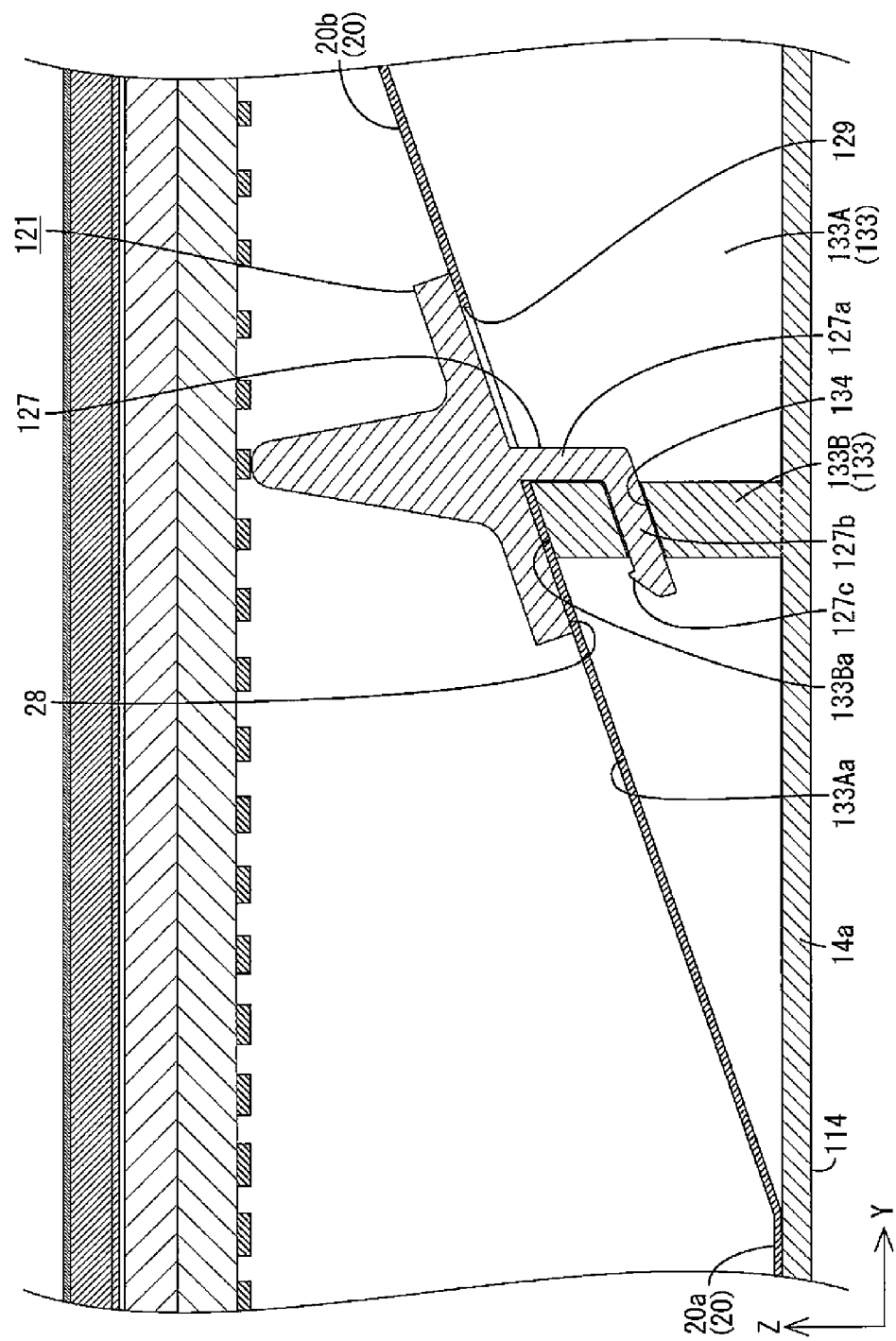
FIG. 20 is a cross section view of FIG. 19 taken along line xx-xx.
Figure 21:
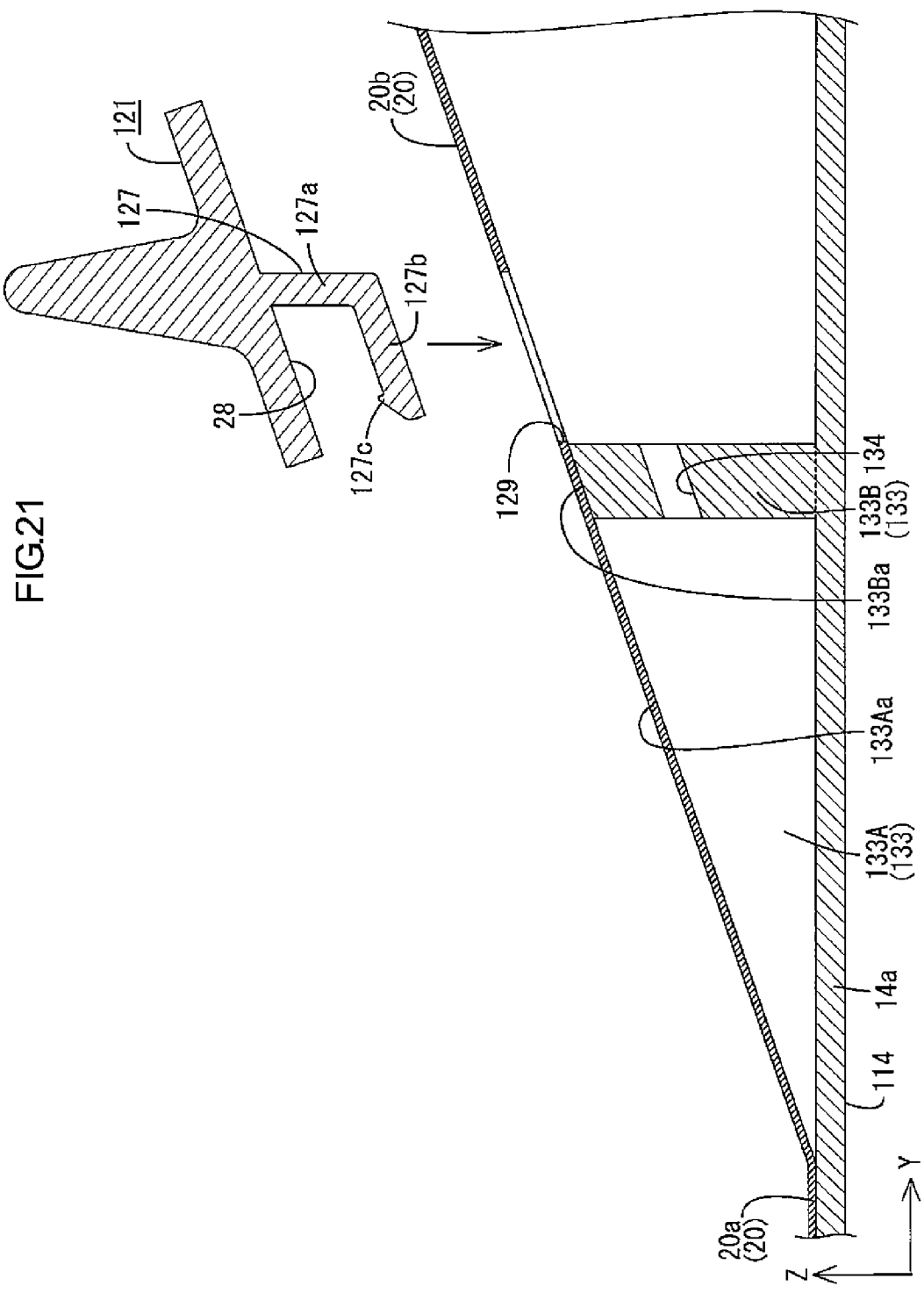
FIG. 21 is a cross section view of FIG. 19 taken along line xx-xx in which the press members are not yet attached.
Figure 22:
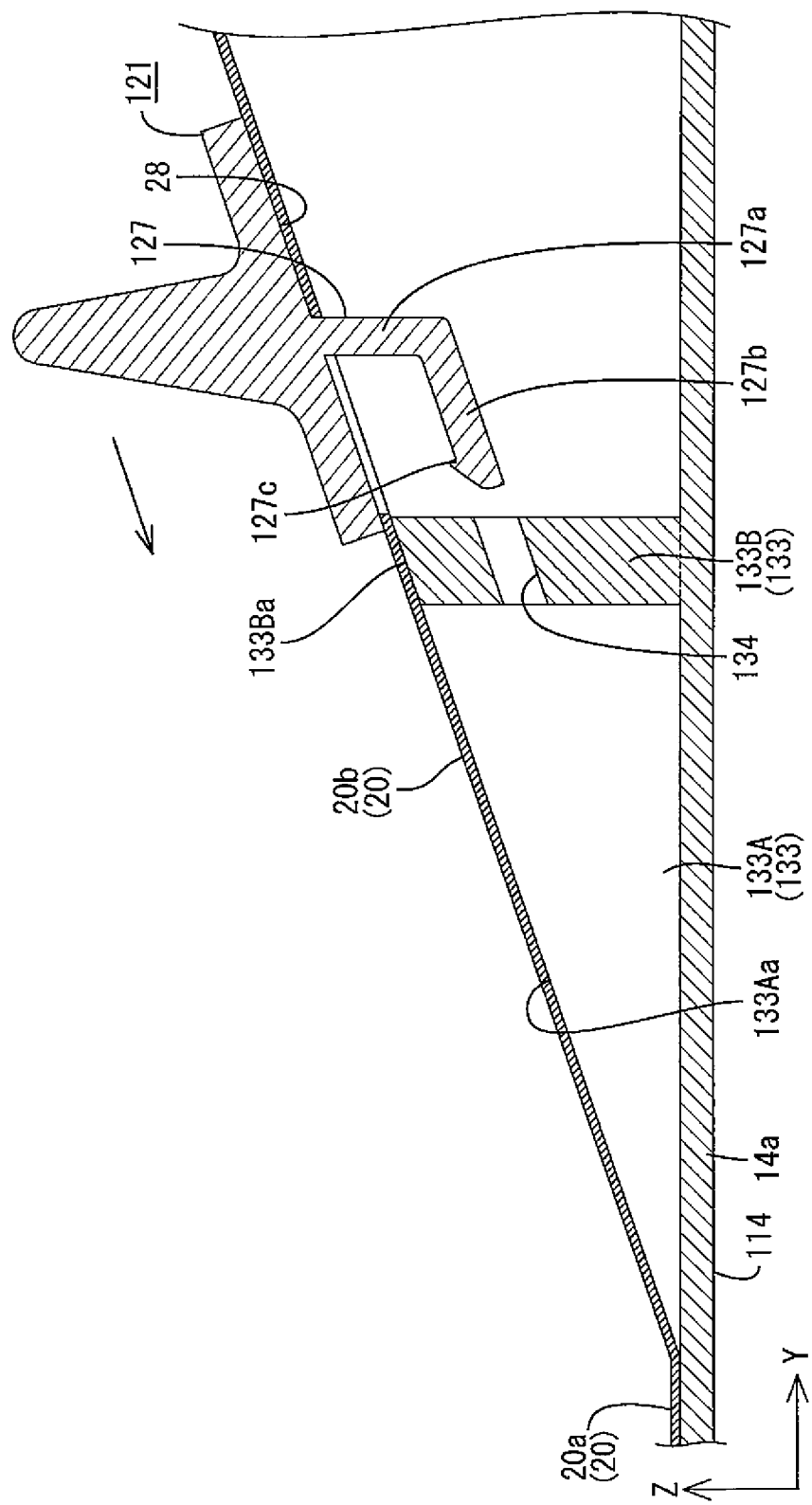
FIG. 22 is a cross section view of FIG. 19 taken along line xx-xx in which the press members are placed in a release position.

FIG. 19 is a plane view showing layout of a hot cathode tube and press members in a chassis, FIG. 20 is a cross section view of FIG. 19 taken along line xx-xx, FIG. 21 is a cross section view of FIG. 19 taken along line xx-xx in which the press members are not yet attached, and FIG. 22 is a cross section view of FIG. 19 taken along line xx-xx in which the press members are placed in a release position.

The spacers 133 are formed by first spacer portions 133A and second spacer portions 133B intersecting with each other in a planar view, as shown in FIG. 19. Specifically, the first spacer portions 133A have a wall-like shape rising from the bottom plate 14a toward the front side, and have main wall surfaces along the Y-axis direction. The first spacer portions 133A having first receiving surfaces 133Aa (FIG. 20) configured to incline and extend along the rising portions 20b of the reflection sheet 20 and receive the rising portions 20b from the back side, which are almost similar to the spacers 33 in the first embodiment in shape, layout in the bottom plate 14a, and number, except for the absence of the mounting holes 34. The second spacer portions 133B each have a wall-like shape rising from the bottom plate 14a toward the front side and have main wall surfaces along the X-axis direction, and are almost perpendicular to the first spacer portions 133A. The second spacer portions 133B are provided in a pair in each of the light source non-placement areas LN of the bottom plate 14a, and are configured to extend along the X-axis direction while passing over almost centers of the first spacer portions 133A along the Y-axis direction. In addition, the second spacer portions 133B are configured to connect to the intersecting first spacer portions 133A and have both ends connected to the both side plates 14b, which makes it possible to further enhance the strength of the chassis 114. Front surfaces of the second spacer portions 133B constitute second receiving surfaces 133Ba inclined in parallel to the rising portions 20b and receiving the rising portions 20b from the back side (FIG. 20). The second receiving surfaces 133Ba are almost flush with first receiving surfaces 133Aa and almost parallel to the same.

Further, press members 121 are attached to the second spacer portions 133B of the spacers 133. Specifically, the press members 121 are overlapping the second spacer portions 133B in a planar view. The press members 121 are attached to the second spacer portions 133B at positions shifted by two each along the X-axis direction, and therefore the press members 121 are arranged in the chassis 114 by four in a zigzag manner in a planar view. The press members 121 are provided at almost middle positions between the second spacer portions 133B and the first spacer portions 133A adjacent to each other along the X-axis direction. Provided at parts of the second spacer portions 133B to which the press members 121 are attached are mounting holes 134 into which mounting portions 127 of the press members 121 can be inserted, as shown in FIG. 20. The mounting holes 134 penetrate the second spacer portions 133B along the through-thickness direction thereof, and are inclined at a predetermined angle with respect to the Y-axis direction such that main inner surfaces of the mounting holes 134 are parallel to the press surfaces 28 and the rising portions 20b.

Direction of sliding of the press members 121 during mounting or removal with respect to the second spacer portions 133B is parallel to the press surfaces 28 and the rising portions 20b, and is inclined with respect to the Y-axis direction. The mounting pieces 127b constituting the mounting portions 127 are configured to extend from the protruding leading ends of the base portions 127a along the direction of sliding. The structure of the mounting portions 127 is almost the same as the structure obtained by rotating the mounting portions 27 in the first embodiment by 90 degrees. In FIGS. 20 to 22 where the Y-axis direction is set as a horizontal direction, the lower oblique left side is aligned to the direction of mounting of the press members 121 (direction of movement during mounting), and the reverse upper oblique right side is aligned to the direction of removal of the press members 21 (direction of movement during removal). In addition, insertion holes 129 of the rising portions 20b are provided at positions shifted from the second spacer portions 133B in the direction of removal.

To attach the press members 121 to the second spacer portions 133B, the press members 121 in the state shown in FIG. 21 are inserted toward the back side along the Z-axis direction to insert the mounting portions 127 into the insertion holes 129. When the press members 121 reach the release position shown in FIG. 22, the press members are then slid in the direction of mounting shown by an arrow in FIG. 22. The direction of sliding is parallel to the press surfaces 28 and the rising portions 20b, and therefore the position of pressing on the rising portions 20b by the press surfaces 28 hardly changes even in the course of sliding. When the press members reach the mounting position shown in FIG. 20, the protruding portions 127c are locked at the edge portions of the mounting holes 134, whereby it is possible to prevent the press members 121 from coming off and press the rising portions 20b stably by the press surfaces 28 from the front side.

According to the embodiment as described above, the spacers 133 have a wall-like shape rising from the bottom plate 14a toward the light output side and include the first spacer portions 133A and the second spacer portions 133B intersecting with each other in a planar view, and the first spacer portions 133A and the second spacer portions 133B are connected to each other. Accordingly, the first spacer portions 133A and the second spacer portions 133B intersecting with each other in a planar view are connected to each other, thereby enhancing the strength of the chassis 114.

Third Embodiment

Third embodiment of the invention will be described with reference to FIGS. 23 to 25. In the third embodiment, the shape of a reflection sheet 220 and layout of spacers 233 and the press members 21 are modified. In the embodiment, the press members 21 have the same structure as that in the first embodiment. The same structures, operations, and advantages as those in the first embodiment are not described here.

Figure 23:
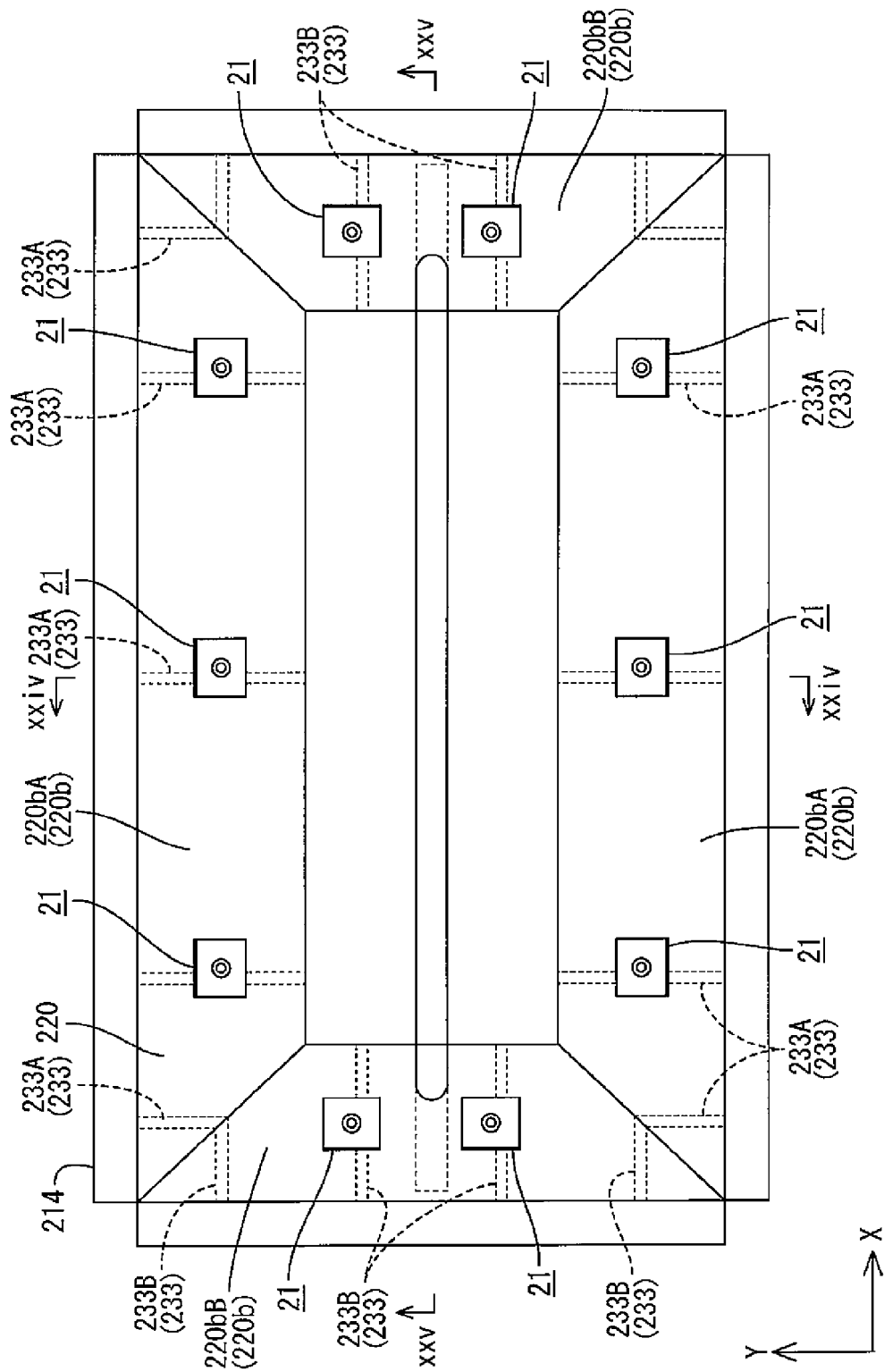
FIG. 23 is a plane view showing layout of a hot cathode tube and press members in a chassis of a third embodiment of the invention.
Figure 24:
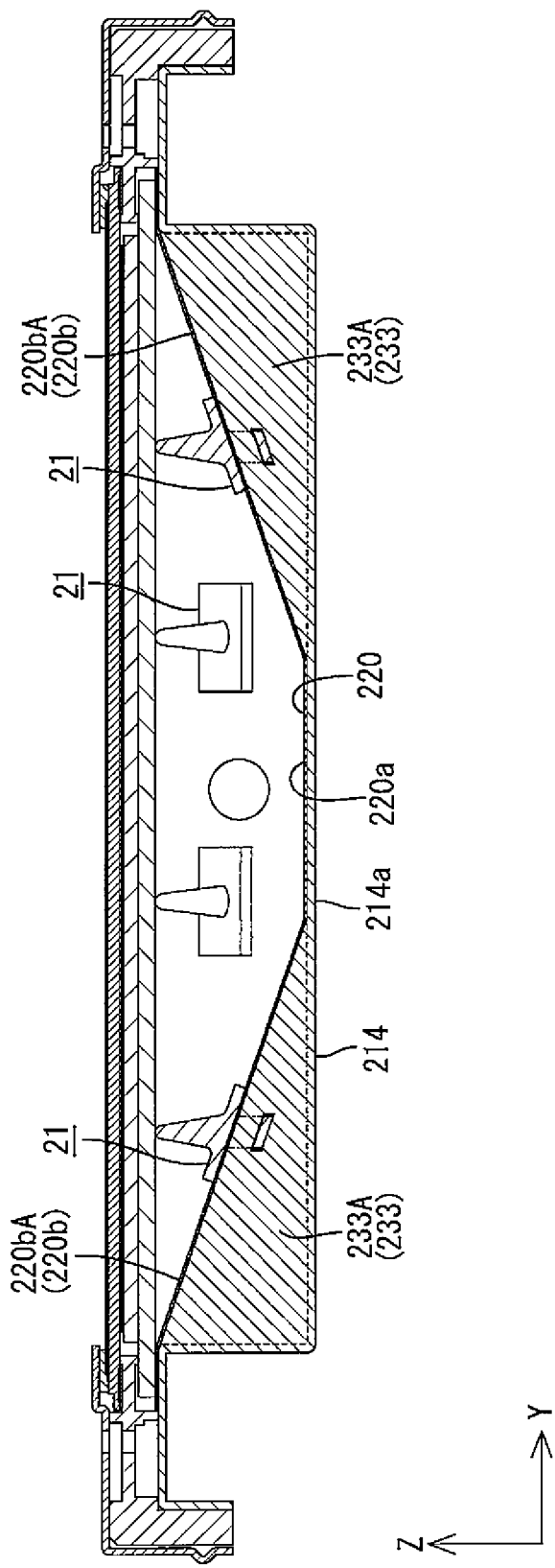
FIG. 24 is a cross section view of FIG. 23 taken along line xxiv-xxiv.
Figure 25:
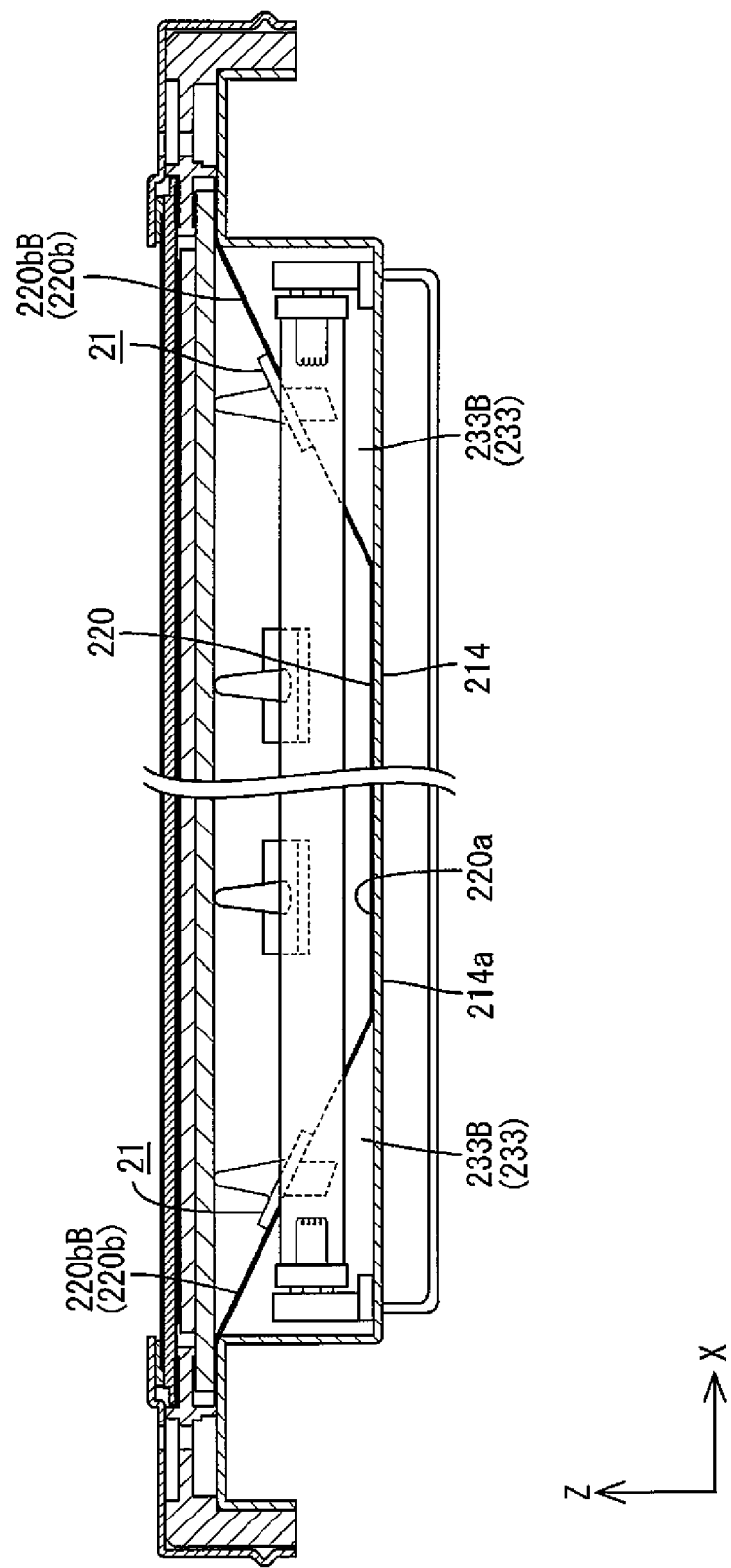
FIG. 25 is a cross section view of FIG. 23 taken along line xxv-xxv.

FIG. 23 is a plane view showing layout of a hot cathode tube and press members in a chassis, FIG. 24 is a cross section view of FIG. 23 taken along line xxiv-xxiv, and FIG. 25 is a cross section view of FIG. 23 taken along line xxv-xxv.

The reflection sheet 220 is entirely formed in a bowl-like shape and includes a bottom portion 220a at the center of the bottom plate 214a of the chassis 214 and four rising portions 220b rising from both end portions of the bottom portion 220a along the longer side and both end portions of the bottom portions 220a along the shorter side, as shown in FIGS. 23 to 25. The rising portions 220b are formed by a pair of first rising portions 220bA rising from both ends of a bottom portion 220a along the longer side and sandwiching the bottom portion 220a along the Y-axis direction; and a pair of second rising portions 220bB rising from both ends of the bottom portion 220a along the shorter side, sandwiching the bottom portion 220a along the X-axis direction, and adjacent to the first rising portions 220bA. The first rising portions 220bA and the second rising portions 220b are inclined so as to rise from the bottom portion 220a at respective predetermined rising angles. The first rising portions 220bA and the second rising portions 220bB are connected to each other and are bent at boundaries therebetween.

The spacers 233 are formed by first spacer portions 233A overlapping the first rising portions 220bA in a planar view; and second spacer portions 233B overlapping the second rising portions 220bB in a planar view. The first spacer portions 233A have a wall-like shape with a main wall surface along the Y-axis direction, whereas the second spacer portions 233B have a wall-like shape with a main wall surface along the X-axis direction, and the main wall surfaces of the first spacer portions 233A and the second spacer portions 233B are substantially perpendicular to (intersect with) each other. The first spacer portions 233A are disposed at five positions separated from each other along the X-axis direction. The first spacer portions 233A on both ends are smaller than the three first spacer portions 233A in the middle. The second spacer portions 233B are disposed at four positions separated from each other along the Y-axis direction. The second spacer portions 233B on both ends are smaller than the two second spacer portions 233B in the middle, and are connected to the first spacer portions 233A on the both ends.

The press members 21 are attached to the larger first spacer portions 233A and second spacer portions 233B in the middle.

Fourth Embodiment

Fourth embodiment of the present invention will be described with reference to FIG. 26 or 27. In the fourth embodiment, cold cathode tubes 40 are used as a light source, and a reflection sheet 320, press members 321, and spacers 333 are modified in shape. In the embodiment, the press members 321 have almost the same structure as that in the first embodiment. The same structures, operations, and advantages as those in the first embodiment are not described here.

FIG. 26 is a plane view showing layout of cold cathode tubes and press members in a chassis, and FIG. 27 is a cross section view of FIG. 26 taken along line xxvii-xxvii.

As shown in FIG. 26, the cold cathode tubes 40 constituting a light source (linear light source) in the embodiment, are each formed in an elongated tubular (linear) shape and include a hollow elongated glass tube with both ends sealed and a pair of electrodes encapsulated in the inside of the both ends of the glass tube. The glass tubes have mercury, rare gas, and the like encapsulated therein, and include inner wall surfaces to which a fluorescent material is applied. The cold cathode tubes 40 have respective relay connectors (not shown) disposed at both ends thereof and connected to lead terminals protruding from the electrodes toward the outside of the glass tubes. The cold cathode tubes 40 are connected via the relay connectors to an inverter board (not shown) attached to the outer surface of the bottom plate 14a of the chassis 14, and are configured to be driven and controlled via the relay connectors. The outer diameter of the cold cathode tubes 40 is about 4 mm, for example, which is smaller than the outer diameter of the hot cathode tubes 17 described above in relation to the first embodiment (about 15.5 mm, for example).

The thus structured cold cathode tubes 40 are stored eccentrically in the chassis 14 so as to have a longer side (in an axial direction) aligned to the longer side of the chassis 14 and be arranged in parallel at six positions at predetermined intervals (arrangement pitch). More specifically, assuming that the bottom plate 14a of the chassis 14 (facing the diffuser plate 30) is divided into a first end portion 14A along the shorter side, a second end portion 14B positioned opposite to the first end portion 14A, and a central portion 14C sandwiched between the first and second end portions, the cold cathode tubes 40 are disposed at the central portion 14C of the bottom plate 14a, thereby to form the light source placement area LA, as shown in FIGS. 26 and 27. The light source placement area LA according to the embodiment is wider than that in the first embodiment. The cold cathode tubes 40 are not disposed in the first end portion 14A and the second end portion 14B of the bottom plate 14a, thereby to form the light source non-placement areas LN. That is, the cold cathode tubes 40 form the light source placement area LA eccentric to the central portion of the bottom plate 14a of the chassis 14 along the shorter side, and the area of the light source placement area LA is larger than the area of each of the light source non-placement areas LN. Further, the ratio of the area of the light source placement area LA (the length along the Y-axis direction) to the area of the entire screen (the vertical dimension of the screen (shorter side dimension)) is about 42%, for example, which is larger than that in the first embodiment. The light source non-placement areas LN in a pair are almost the same in area. In addition, the cold cathode tubes 40 are formed to be almost equal in length to the horizontal dimension of the screen (longer side dimension).

Bottom portion 320a of a reflection sheet 320 is slightly larger in shorter side dimension than the light source placement area LA of the bottom plate 14a of the chassis 14, and overlaps the light source placement area LA in a planar view. That is, the bottom portion 320a is extended in formation range according to the light source placement area LA, whereas rising portions 320b are reduced in formation range in correspondence with the light source non-placement areas LN. Therefore, the angle of rising of the rising portions 320b from the bottom portion 320a is larger than that in the first embodiment. In addition, in correspondence with change in the rising angle of the rising portions 320b, the angle formed along the Y-axis direction by press surfaces 328 of press portions 325 in press members 321 is changed, and the angle formed along the Y-axis direction by receiving surfaces 333a of the spacers 333 is changed.

According to the embodiment as described above, the light source is formed by the cold cathode tubes 40. This achieves longer life of the light source and facilitates light regulation.

Fifth Embodiment

Fifth embodiment of the invention will be described with reference to FIG. 28 or 29. In the fifth embodiment, LEDs 50 are used as a light source. In the embodiment, the press members 21 have almost the same structure as that in the first embodiment. The same structures, operations, and advantages as those in the first embodiment are not described here.

FIG. 28 is a plane view showing layout of LEDs and a press member in a chassis, and FIG. 29 is a cross section view of FIG. 28 taken along line xxix-xxix.

In the embodiment, a large number of LEDs 50 as a light source are mounted on an LED board 51 stored in the chassis 14, thereby to constitute a linear light source extending along the X-axis direction as a whole, as shown in FIGS. 28 and 29. The LED board 51 is made of synthetic resin, and has a surface of a white color excellent in light reflectivity, and is fixed to the bottom plate 14a of the chassis 14 by a fixing means not shown. The LED board 51 extends along the bottom plate 14a of the chassis 14, and has a horizontally long rectangular shape in a planar view, and is attached to the bottom plate 14a so as to have a longer side aligned to the longer side of the chassis 14. The shorter side dimension of the LED board 51 is smaller than the vertical dimension of the screen (the shorter side dimension of the chassis 14), and the longer side dimension of the LED board 51 is almost equal to the horizontal dimension of the screen (the longer side dimension of the chassis 14). In addition, the LED board 51 has a wiring pattern formed by a metal film on which the LEDs 50 are mounted at predetermined positions. The LED board 51 is connected to an external control board not shown from which power needed for illumination of the LEDs 50 is supplied to drive and control the LEDs 50.

The LEDs 50 are so-called surface-mounted components that are mounted on the surface of the LED board 51, and are numerously arranged in parallel on the front side of the LED board 51 in a grid-like pattern (in a matrix) along the X-axis direction and the Y-axis direction. The LEDs 50 are configured such that LED chips are encapsulated by means of a resin material on a board portion fixed to the LED board 51. The LED chips mounted on the board portion are classified under three types with different main emission wavelengths. Specifically, each of the LED chips emits single light of R (red), G (green), or B (blue). The LEDs 50 are a top type in which the surface of the LEDs 50 opposite to the surface of the same mounted on the LED board 51 constitutes the emission surface. Optical axis of the LEDs 50 is almost aligned to the Z-axis direction (the direction perpendicular to the plate planes of the liquid crystal panel 11 and the optical member 15).

Assuming that the bottom plate 14a of the chassis 14 (facing the diffuser plate 30) is evenly divided along the shorter side into the first end portion 14A, the second end portion 14B positioned opposite to the first end portion 14A, and the central portion 14C sandwiched between the first and second end portions, the LED board 51 with the LEDs 50 numerously mounted is disposed at the central portion 14C of the bottom plate 14a, thereby to form the light source placement area LA. The LED board 51 is not disposed at the first end portion 14A and the second end portion 14B of the bottom plate 14a, thereby to form the light source non-placement area LN. That is, the LEDs 50 and the LED board 51 form the light source placement area LA eccentric to the central portion of the bottom plate 14a of the chassis 14 along the shorter side. In addition, the ratio of the area of the light source placement area LA (the length along the Y-axis direction) to the area of the entire screen (the vertical dimension (shorter side dimension) of the screen) can be set as appropriate. The ratio may be identical to that in the first embodiment or the fourth embodiment, or may be set at a value other than those in the first and fourth embodiments.

According to the embodiment as described above, the light source is formed by the LEDs 50. This achieves longer life and lower power consumption of the light source.

Other Embodiments

The invention is not limited to the embodiments described in the foregoing text and the drawings. The following embodiments are also included in the technical scope of the invention, for example.

(1) In the foregoing embodiments, the main plate surfaces of the mounting pieces (main inner surfaces of the mounting holes) are parallel to the press surfaces and the rising portions, and are inclined with respect to the Y-axis direction. However, the invention also includes an arrangement in which the main plate surfaces of the mounting pieces (main inner surfaces of the mounting holes) are configured to be parallel to the Y-axis direction.

(2) In the foregoing embodiments, the mounting holes constituting the mounting structures are configured to penetrate the spacers in the through-thickness direction. Alternatively, for example, the press members may be attached by concaving the main wall surfaces of the spacers to provide mounting recesses that do not extend all the way through the spacers, as the mounting structures, and fitting the mounting pieces into the mounting recesses.

(3) In the foregoing embodiments, the protruding portions protrude from the mounting pieces toward the press surfaces. However, the invention also includes an arrangement in which the protruding portions protrude from the mounting pieces toward the side opposite to the press surfaces, and an arrangement in which the protruding portions protrude from the mounting pieces along the Y-axis direction. In addition, the protruding portions may be omitted.

(4) In the foregoing embodiments, as the mounting structures, the mounting pieces are provided to the press members, and the mounting holes (mounting recesses) are provided to the spacers. On the contrary, the mounting holes (mounting recesses) may be provided to the press members, and the mounting portions may be provided to the spacers.

(5) In the foregoing embodiment, the spacers have the receiving surfaces receiving the rising portions from the back side. However, the invention also includes an arrangement in which the spacers are provided without receiving surfaces.

(6) In the foregoing embodiment, the angle formed by the press surfaces of the press portions (the receiving surfaces of the spacers) with respect to the Y-axis direction and the angle formed by the rising portions with respect to the Y-axis direction are almost the same. However, the invention also include an arrangement in which the angle formed by the press surfaces (receiving surfaces) with respect to the Y-axis direction is larger or smaller than the angle formed by the rising portions with respect to the Y-axis direction.

(7) In the foregoing embodiment, the press portions and the rising portions are inclined in almost the same shape. However, the press portions and the rising portions may be different in shape. For example, the press portions may be arc-shaped (curved) and the rising portions may be inclined, and the opposite is also possible. Similarly, the spacers may be different in shape from at least one of the press portions and the rising portions.

(8) In the foregoing embodiments, the angle formed by the press surfaces of the press portions (receiving surfaces of the spacers) with respect to the Y-axis direction and the angle formed by the rising portions with respect to the Y-axis direction, are both acute angles less than 45 degrees. However, the invention also includes an arrangement in which these angles are acute angles equal to or larger than 45 degrees.

(9) Other than those in the foregoing embodiments, the mounting position of the press members in the chassis can be changed as appropriate. Similarly, the mount position of the spacers in the chassis can also be changed as appropriate.

(10) Other than those in the foregoing embodiments, the planar shape and cross section shape of the spacers can be changed as appropriate.

(11) In the foregoing embodiments, the axial direction of the support portions is aligned to the Z-axis direction. However, the invention also includes an arrangement in which the axial direction of the support portions is slightly inclined with respect to the Z-axis direction. Similarly, the axial direction of the mounting pieces can also be changed.

(12) The foregoing first and second embodiments have two kinds of press members with different mounting structures with respect to the chassis. As a matter of course, the two kinds of press members can be mixed in one chassis.

(13) In the foregoing second embodiment, the first spacer portions and the second spacer portions are almost perpendicular to each other in a planar view. Alternatively, the angle formed by the first spacer portions and the second spacer portions can be different from a right angle.

(14) In the foregoing embodiments, the chassis is made of synthetic resin. However, the invention is also applicable to an arrangement in which the chassis is made of metal. In that case, the spacers can be integrally formed by subjecting the bottom plate to a squeezing process. Alternatively, the spacers may be manufactured as a separate component made of synthetic resin and attached to the metallic chassis later.

(15) In the foregoing embodiments, the press portions partially press the rising portions in the direction headed from the bottom portion to the rising portions. However, the invention also includes an arrangement in which the press portions press the rising portions over the entire length.

(16) In the foregoing embodiments, the rising portions are disposed at ends of the reflection sheet. However, the invention is also applicable to an arrangement in which the rising portions having a chevron shape in cross section are provided at the center of the reflection sheet. Even in that case, the press members may be attached in a position corresponding to the rising portions.

(17) In the foregoing embodiments, the reflection sheet is configured to have the bottom portion and the rising portions connected to each other. However, the invention is also applicable to an arrangement in which a reflection sheet is configured to have a separation structure where the bottom portion and the rising portions are separated.

(18) In the foregoing third embodiment, the cold cathode tubes in the fourth embodiment may be used or the LEDs in the fifth embodiment may be used as a light source.

(19) In the foregoing embodiments, the surfaces of the press members are colored in white. Alternatively, the color of the surfaces of the press members may be milky white or silver, for example. In addition, the color of the surfaces of the press members can be set by applying a paint of a desired color.

(20) In the foregoing embodiments, the support portions come into contact with the diffuser plate in a straight state along the X-axis direction and the Y-axis direction. However, the invention also includes an arrangement in which the support portions do not come into contact with the diffuser plate in a straight state as described above (specifically, the protruding leading ends of the support portions are disposed nearer to the light source than the light source-side surface of the diffuser plate). According to the arrangement, even if the diffuser plate thermally expands due to change in thermal environment in the backlight unit, the diffuser plate is permitted to deform so as to curve toward the light source within the range of the clearance between the support portions and the diffuser plate. Accordingly, the diffuser plate is unlikely to be flexed or shrunk, which makes it less prone to generate uneven brightness in illumination light emitted from the diffuser plate.

(21) In the foregoing first embodiment, the one hot cathode tube is used as a light source. However, the number of the hot cathode tube(s) can be changed and may be two or more. Specifically, if two hot cathode tubes are used, for example, the ratio of the light source placement area to the vertical dimension of the screen is preferably about 37%. Even in the case of using three or more hot cathode tubes, the ratio of the light source placement area may also be adjusted in proportion to the number of the hot cathode tubes.

(22) In the foregoing fourth embodiment, the six cold cathode tubes are used as a light source. However, the number of cold cathode tubes can be changed and may be five or less or seven or more. Specifically, in the case of using four cold cathode tubes, for example, the ratio of the light source placement area to the vertical dimension of the screen is preferably about 26%. In addition, in the case of using eight cold cathode tubes, for example, the ratio of the light source placement area to the vertical dimension of the screen is preferably about 58%. Even in the cases where the number of cold cathode tubes to be used is changed otherwise, the ratio of the light source placement area may also be adjusted in proportion to the number of the cold cathode tubes.

(23) In the foregoing fifth embodiment, the size of the LED board with respect to the chassis, the positions and number of the LEDs to be mounted on the LED board, and the like, may be modified as appropriate.

(24) In the foregoing embodiments, the central portion of the chassis is set as a light source placement area, and the first and second end portions of the same are set as light source non-placement areas. However, the invention also includes an arrangement in which at least one of the first and second end portions in the chassis is set as a light source placement area, and the other is set as a light source non-placement area. In this case, the first end portion and the central portion may be set as a light source placement area, or the second end portion and the central portion may be set as a light source placement area.

(25) In the foregoing embodiments, the light sources are eccentrically disposed in the chassis (including the light source placement area and the light source non-placement areas). However, the invention is also applicable to an arrangement in which the light source is evenly disposed over the entire chassis.

(26) In the foregoing first to fourth embodiments, the hot cathode tubes or the cold cathode tubes as a kind of fluorescent tube (linear light source), are used as a light source. However, the invention also includes an arrangement in which any other kind of fluorescent tube is used. In addition, the invention also includes an arrangement using discharge tubes of kinds other than fluorescent tubes (such as mercury lamps).

(27) In the foregoing fifth embodiment, the LEDs, which are a kind of point light source, are used as a light source. However, the invention also includes an arrangement using any other kind of point light source. Alternatively, a planar light source such as organic ELs may be used in the invention.

(28) In the foregoing embodiments, one kind of light source is used. However, the invention also includes an arrangement using in mixture a plurality of kinds of light sources. Specifically, hot cathode tubes and cold cathode tubes may be used in mixture, hot cathode tubes and LEDs may be used in mixture, or cold cathode tubes and LEDs may be used in mixture, or hot cathode tubes and cold cathode tubes and LEDs may be used in mixture.

(29) In the foregoing embodiments, the dots of the dot pattern constituting the light reflecting portion of the diffuser plate are formed in a round shape. However, the shape of the dots is not limited to this, and any shape can be selected such as an oval shape or a polygonal shape.

(30) In the foregoing embodiments, the light reflecting portion is formed by means of printing on the surface of the diffuser plate. However, the invention also includes an arrangement using any other formation means, for example, metal vapor deposition.

(31) In the foregoing embodiments, the in-plane light reflectance of the diffuser plate is adjusted by forming the light reflecting portion on the surface of the diffuser plate. Alternatively, the light reflectance of the diffuser plate may be adjusted in a manner as described below, for example. The diffuser plate is generally configured such that light scattering particles are dispersed in a light transmissive substrate. Accordingly, the light reflectance of the diffuser plate itself can be determined by the ratio of mixture of light scattering particles (weight %) in the light transmissive substrate. Specifically, the light reflectance can be made relatively large by making relatively large the ratio of mixture of the light scattering particles, and the light reflectance can be made relatively small by making relatively small the ratio of mixture of the light scattering particles.

(32) In the foregoing embodiments, the light reflectance of the diffuser plate is designed and controlled by changing the areas of the dots constituting the light reflecting portion. However, the invention also includes an arrangement where the light reflectance is controlled by changing space between dots of the same areas, or by forming dots different in light reflectance, or the like. In relation to the foregoing, dots different in light reflectance can be formed using a plurality of materials different in light reflectance.

(33) In the foregoing embodiments, the light reflecting portion is formed on the diffuser plate of the optical member, and the light reflectance on the light reflecting portion is controlled as appropriate. However, the invention also includes an arrangement where the light reflecting portion is formed on the optical member other than the diffuser plate, and the light reflectance on the thus formed light reflecting portion is controlled as appropriate. In addition, the numbers and kinds of the diffuser plate and the optical sheet as optical members can be changed as appropriate.

(34) The screen size, aspect ratio, and the like of the liquid crystal display device can be changed as appropriate, besides those in the foregoing embodiments.

(35) In the foregoing embodiments, the liquid crystal panel and the chassis are placed in portrait orientation with the shorter side aligned to the vertical direction. However, the invention also includes an arrangement in which the liquid crystal panel and the chassis are placed in portrait orientation with the longer side aligned to the vertical direction.

(36) In the foregoing embodiments, TFTs are used as a switching component of the liquid crystal display device. However, the invention is also applicable to other liquid crystal display devices using a switching component other than TFTs (thin-film diodes (TFDs), for example). In addition, the invention is also applicable to both liquid crystal display devices of color representation and liquid crystal display devices of black and white representation.

(37) In the foregoing embodiments, the liquid crystal display device uses the liquid crystal panel as a display panel. However, the invention is also applicable to display devices using any other kind of display panel.

(38) In the foregoing embodiments, the television receiver includes a tuner. However, the invention is also applicable to display devices not including a tuner.

The invention claimed is:
1. A lighting device comprising:
a light source;
a chassis including a bottom plate disposed on a side opposite to a light output side with respect to the light source and housing the light source;
a reflection sheet including a bottom portion disposed along the bottom plate and a rising portion rising from the bottom portion toward the light output side and reflecting light;
a spacer arranged between the bottom plate and the rising portion; and
a press member having a press surface pressing the rising portion from the light output side, wherein
the press member and the spacer have mounting structures with which the press member is mounted to the spacer by moving the press member in a direction along the rising portion and to held the press member to the spacer.

2. The lighting device according to claim 1, wherein the spacer has a wall-like shape rising from the bottom plate and arranged such that a thickness direction thereof aligned with the direction in which the press member is moved during mounting thereof to the spacer.

3. The lighting device according to claim 2, wherein the mounting structures include a mounting piece and a mounting hole, the mounting piece extending along the thickness direction of the spacer, the mounting hole being formed through the spacer in the thickness direction so as to receive the mounting piece.

4. The lighting device according to claim 3, wherein the mounting piece has a protruding portion held to an edge of the mounting hole.

5. The lighting device according to claim 3, wherein the mounting piece and the mounting hole are arranged parallel to the rising portion.

6. The lighting device according to claim 1, wherein the direction in which the press member is moved during mounting thereof to the spacer is perpendicular to a direction from the bottom portion of the reflection sheet to the rising portion of the reflection sheet.

7. The lighting device according to claim 1, wherein the spacer has a receiving surface configured to receive the rising portion from the side opposite to the light output side.

8. The lighting device according to claim 1, wherein the rising portion has an insertion hole through which one of the mounting structures is passed.

9. The lighting device according to claim 1, further comprising an optical member disposed on the light output side with respect to the light source, wherein the press member includes a support portion having an axis across space in the chassis and supporting the optical member from the side opposite to the light output side.

10. The lighting device according to claim 9, wherein the rising portion and the press surface are arranged so as to intersect with an axial direction of the support portion and a direction perpendicular to the axial direction.

11. The lighting device according to claim 10, wherein the rising portion and the press surface are arranged such that an angle between the rising portion and the direction perpendicular to the axial direction and an angle between the press surface and the direction perpendicular to the axial direction are substantially equal.

12. The lighting device according to claim 10, wherein the angle between the rising portion and the direction perpendicular to the axial direction and the angle between the press surface and the direction perpendicular to the axial direction are acute angles.

13. The lighting device according to claim 10, wherein the rising portion and the press surface are sloped.

14. The lighting device according to claim 9, wherein the axial direction of the support portion is substantially perpendicular to a plate surface of the optical member.

15. The lighting device according to claim 1, wherein the spacer has a wall-like shape rising from the bottom plate toward the light output side, and including a first spacer portion and a second spacer portion intersecting with each other in a planar view and connected to each other.

16. The lighting device according to claim 1, wherein the press member is formed such that the press surface presses a part of the rising portion in the direction from the bottom portion to the rising portion.

17. The lighting device according to claim 1, wherein:
the chassis has a side plate and a receiving plate, the side plate rising from an edge of the bottom plate toward the light output side, the receiving plate jutting outward from a distal end of the side plate; and
the reflection sheet has an extending portion extending from a distal end of the rising portion along the receiving plate.

18. The lighting device according to claim 1, wherein the chassis includes a light source placement area where the light source is disposed and a light source non-placement area where the light source is not disposed.

19. The lighting device according to claim 18, wherein:
the chassis includes at least a first end portion, a second end portion positioned opposite to the first end portion, and a central portion between the first end portion and the second end portion; and
the light source placement area corresponds to the central portion, and the light source non-placement area corresponds to each of the first end portion and the second end portion.

20. The lighting device according to claim 18, wherein at least part of the bottom portion is disposed in the light source placement area, and at least part of the rising portion is disposed in the light source non-placement area.

21. The lighting device according to claim 18, further comprising an optical member disposed at the light output side with respect to the light source, the optical member having a surface opposite the light source, the surface including an area overlapping the light source placement area and an area overlapping the light source non-placement area, at least the surface being configured such that light reflectance of the area overlapping the light source non-placement area is hither than that of the area overlapping the light source placement area.

22. The lighting device according to claim 21, wherein at least the surface opposite the light source is configured such that the light reflectance decreases as a distance from the light source increases.

23. The lighting device according to claim 1, wherein the press member has a surface in a white color.

24. The lighting device according to claim 1, wherein the light source is a hot cathode tube.

25. The lighting device according to claim 1, wherein the light source is a cold cathode tube.

26. The lighting device according to claim 1, wherein the light source is an LED.

27. A display device comprising:
the lighting device according to claim 1; and
a display panel configured to provide display using light from the lighting device.

28. The display device according to claim 27, wherein the display panel is a liquid crystal panel including liquid crystals sealed between a pair of substrates.

29. A television receiver comprising the display device according to claim 27.

* * * * *